United States Patent
Ghosh

(10) Patent No.: US 10,863,739 B2
(45) Date of Patent: Dec. 15, 2020

(54) STABLE EMULSION FORMULATIONS OF ENCAPSULATED VOLATILE COMPOUNDS

(71) Applicant: AgroFresh Inc., Collegeville, PA (US)

(72) Inventor: Tirthankar Ghosh, Oreland, PA (US)

(73) Assignee: AGROFRESH INC., Philadelphia, PA (US)

( * ) Notice: Subject to any disclaimer, the term of this patent is extended or adjusted under 35 U.S.C. 154(b) by 8 days.

(21) Appl. No.: 15/146,395

(22) Filed: May 4, 2016

(65) Prior Publication Data
US 2016/0324147 A1 Nov. 10, 2016

Related U.S. Application Data

(60) Provisional application No. 62/157,588, filed on May 6, 2015.

(51) Int. Cl.
*A01N 25/04* (2006.01)
*A01N 27/00* (2006.01)

(52) U.S. Cl.
CPC ............ *A01N 25/04* (2013.01); *A01N 27/00* (2013.01)

(58) Field of Classification Search
None
See application file for complete search history.

(56) References Cited

U.S. PATENT DOCUMENTS

| | | | |
|---|---|---|---|
| 3,539,465 A | 11/1970 | Hiestand et al. | |
| 4,464,524 A | 8/1984 | Karickhoff | |
| 4,931,210 A * | 6/1990 | Takahashi | A61K 8/066 424/59 |
| 5,518,988 A | 5/1996 | Sisler et al. | |
| 6,017,849 A | 1/2000 | Daly et al. | |
| 7,691,935 B2 | 4/2010 | Sakamoto | |
| 8,691,728 B2 | 4/2014 | Kostansek et al. | |
| 8,946,122 B2 | 2/2015 | Fowler et al. | |
| 2002/0025986 A1* | 2/2002 | Rodham | A01N 25/28 516/98 |
| 2003/0060379 A1* | 3/2003 | Souter | A01N 31/02 510/131 |
| 2004/0014603 A1* | 1/2004 | Wollenweber | A01N 57/20 504/128 |
| 2004/0082480 A1* | 4/2004 | Daly | A01N 3/02 504/356 |
| 2004/0101613 A1* | 5/2004 | Levi | A23D 7/0053 426/601 |
| 2008/0113867 A1* | 5/2008 | Kostansek | A01N 27/00 504/357 |
| 2010/0161029 A1* | 6/2010 | Filippini | A61K 8/066 623/1.15 |
| 2014/0080712 A1 | 3/2014 | Lao et al. | |

FOREIGN PATENT DOCUMENTS

| | | |
|---|---|---|
| EP | 1226864 | 7/2002 |
| JP | 2010-173989 | 12/2010 |
| WO | 2001/078888 | 10/2001 |
| WO | 2004047562 | 6/2004 |
| WO | 2010/080891 | 7/2010 |
| WO | WO 2014110942 A1 * | 7/2014 ............. A01N 25/28 |

OTHER PUBLICATIONS

Cray Valley, "Technical Data Sheet: SMA® 2000 H Solution," published Mar. 2016, p. 1.*
Cray Valley, "Approximate HLB values of SMA® Resins and Esters—Anionic Surfactants," published Jan. 2010, p. 1-2.*
Hattrem et al., 2015, Ibuprofen-in-cyclodextrin-in-W/O/W emulsion—Improving the initial and long-term encapsulation efficiency of a model active ingredient, International Journal of Pharmaceutics; 487: p. 1-7.
Food and Agriculture Organization ("FAO"), "Definition and Classification of Commodities," Mar. 23, 2006; http://www.fao.org/es/faodef/faodefe.htm.
International Search Report and Written Opinion prepared for PCT/US2016/030723, dated Aug. 5, 2016, 11 pages.
EESR of EP Application No. 16789995, dated Oct. 12, 2018.

* cited by examiner

Primary Examiner — Monica A Shin
(74) Attorney, Agent, or Firm — Barnes & Thornburg LLP

(57) ABSTRACT

The present invention is based on the discovery of a stable water-in-oil-in-water double emulsion. The double emulsion composition disclosed may contain molecular complex of volatile compounds for example 1-methylcyclopropene (1-MCP). In addition, the double emulsion composition disclosed can provide prolong or controlled release of the volatile compounds.

20 Claims, 1 Drawing Sheet

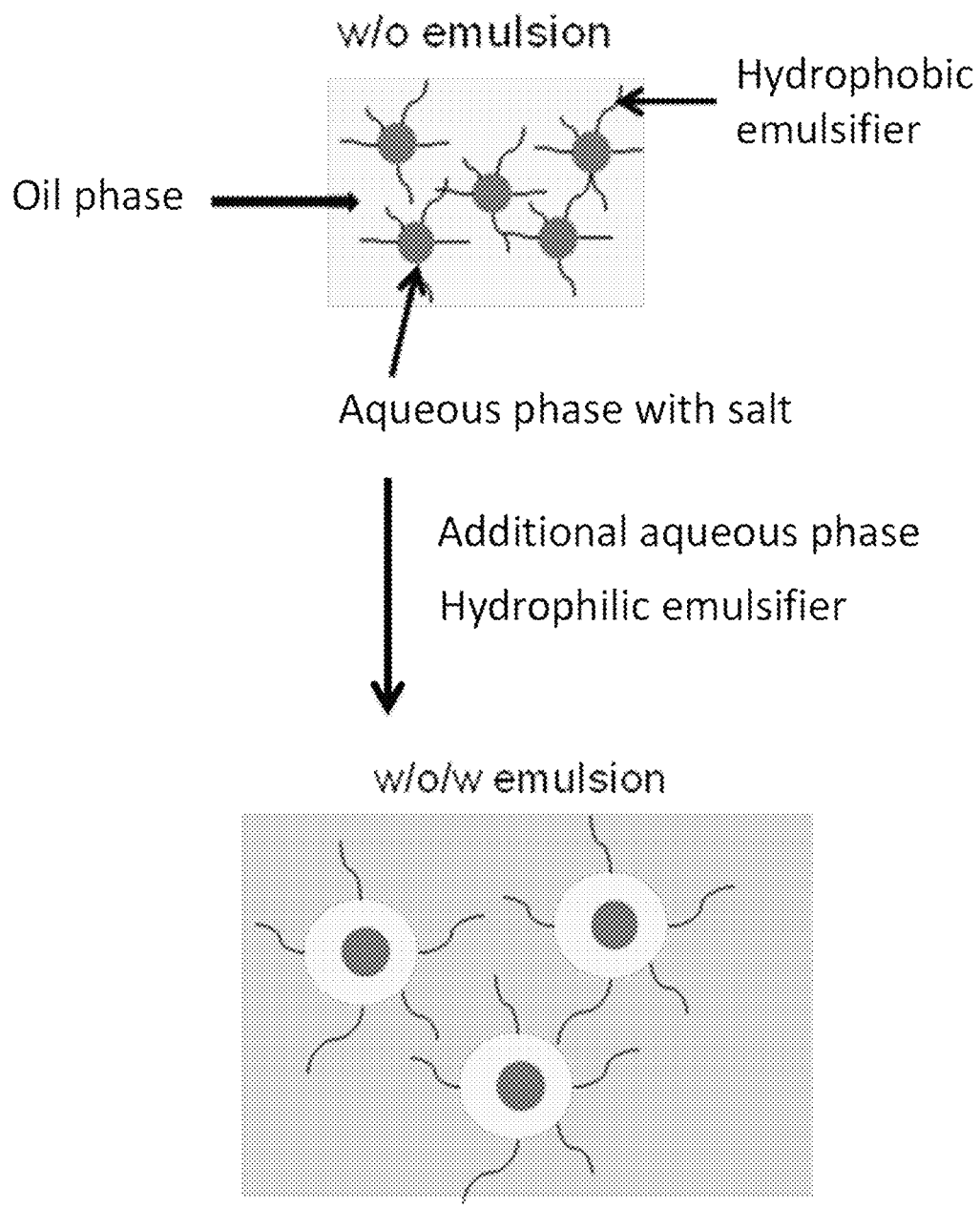

STABLE EMULSION FORMULATIONS OF ENCAPSULATED VOLATILE COMPOUNDS

CROSS-REFERENCE TO RELATED APPLICATIONS

This application claims the benefit under 35 USC § 119(e) of U.S. Provisional Application Ser. No. 62/157,588, filed on May 6, 2015, the entire disclosure of which is incorporated herein by reference.

BACKGROUND OF THE INVENTION

Various compounds can be encapsulated using certain molecular encapsulating agents. Encapsulation provides a means to control the delivery of these compounds into the matrix of use. For example, volatile cyclopropene compounds are known to be encapsulated using cyclodextrins. Cyclopropene compounds are useful for treating plants or plant parts. As a way of storing cyclopropenes or of delivering them to plant parts, or both, it is sometimes useful to form complexes of cyclopropene molecules with molecular encapsulating/complexing agents. It is also known that contacting encapsulated cyclopropene with a solvent (for example tap water) can quickly release cyclopropene molecules from the complex into air space. Thus, liquid (especially aqueous) formulations of encapsulated cyclopropene compounds are typically unstable for storage purpose.

1-Methylcyclopropene (1-MCP) is a gas difficult to handle and store; it is also flammable above a concentration of 13,300 parts per million (ppm). As a result, in current agriculture applications, 1-MCP is usually stabilized into a clathrate such as α-cyclodextrin (alpha-cyclodextrin or α-CD) to ease handling during storage and transportation. The active ingredient 1-MCP is caged in α-CD, and the resulting crystalline complex is called a High Active Ingredient Product (HAIP). HAIP is typically composed of 100-150 micron (μm) needle-like crystals but can be air-milled to a 3-5 μm fine powder if needed. HAIP product can be stored for up to two years at ambient temperature inside a sealed container lined with a moisture barrier without loss of 1-MCP. Although the product is more convenient for the application than the 1-MCP gas itself, it still has some disadvantages: (1) it is in a powder form and thus is difficult to handle in the field or in an enclosed space; and (2) it is water-sensitive, and releases 1-MCP gas completely within a short period of time when in contact with water. Upon contact with water or even moisture, 1-MCP gas will be quickly released at a rate which is not compatible with tank use as most of the gas will be lost in the tank headspace before the product has a chance to be sprayed in the field.

As provided herein, a stable water-in-oil (W/O) emulsion can be made with water based dispersion of HAIP (containing magnesium sulfate, polyvinyl alcohol, and other ingredients) in various oils (for example soybean oil) containing emulsifiers. An aqueous dispersion of HAIP (containing >7 grams (g) of 1-MCP per liter (/L)) can be used to make stable water-in-oil dispersions where the 1-MCP concentration is <4 g/L or <10 g/L. Their formulations may have <5,000 ppm of 1-MCP in the headspace.

It is well known that adding water to HAIP (nominally 4.5% 1-MCP) rapidly releases 1-MCP. Hence to design a stable product concentrate with HAIP that can be diluted with water in the field or a ready-to-use product with low active ingredient (AI), it will be important to isolate the HAIP from the continuous water phase. One way of achieving this is via emulsion technology, specifically utilizing a water-in-oil-in-water emulsification approach.

Accordingly, there remains a need to develop stable liquid formulations for encapsulated volatile compounds, especially for long term storage of concentrated formulations which can be diluted with water before field applications.

SUMMARY OF THE INVENTION

The present invention is based on the discovery of a stable water-in-oil-in-water double emulsion in addition to a stable aqueous-in-oil emulsion. The double emulsion composition provided and/or the stable aqueous-in-oil emulsion disclosed may contain molecular complexes of volatile compounds for example 1-methylcyclopropene (1-MCP). In addition, the double emulsion composition provided and/or the stable aqueous-in-oil emulsion disclosed can provide prolonged or controlled release of the volatile compounds. Due to its unexpected stability, the double emulsion composition disclosed can also be used as a stock solution or concentrated solution to be further diluted with water as sprayable or oral formulations.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

The following numbered embodiments are contemplated and are non-limiting:

1. An aqueous-in-oil-in-aqueous double emulsion composition comprising:
   (a) an aqueous-in-oil emulsion composition;
   (b) a hydrophilic emulsifier;
   (c) a surfactant; and
   (d) a second aqueous phase.
2. The aqueous-in-oil-in-aqueous double emulsion composition of clause 1, wherein the aqueous-in-oil emulsion composition comprises an aqueous phase containing salt (APCS).
3. The aqueous-in-oil-in-aqueous double emulsion composition of clause 2, wherein the APCS comprises water.
4. The aqueous-in-oil-in-aqueous double emulsion composition of clause 2 or clause 3, wherein the APCS comprises water at an amount selected from the group consisting of more than 20% water by weight, more than 30% water by weight, more than 50% water by weight, and more than 60% water by weight (based on the weight of the composition).
5. The aqueous-in-oil-in-aqueous double emulsion composition of any one of clauses 2 to 4, wherein the APCS comprises one or more salts.
6. The aqueous-in-oil-in-aqueous double emulsion composition of any one of clauses 2 to 5, wherein no chloride salt is used.
7. The aqueous-in-oil-in-aqueous double emulsion composition of any one of clauses 2 to 6, wherein the salt is a non-deliquescent salt.
8. The aqueous-in-oil-in-aqueous double emulsion composition of any one of clauses 2 to 7, wherein the salt is dissolved in the aqueous phase.

9. The aqueous-in-oil-in-aqueous double emulsion composition of any one of clauses 2 to 8, wherein the salt comprises magnesium sulfate or ammonium sulfate.

10. The aqueous-in-oil-in-aqueous double emulsion composition of any one of clauses 2 to 8, wherein the salt comprises magnesium sulfate.

11. The aqueous-in-oil-in-aqueous double emulsion composition of any one of clauses 2 to 8, wherein the salt comprises ammonium sulfate.

12. The aqueous-in-oil-in-aqueous double emulsion composition of any one of clauses 2 to 11, wherein the salt comprises magnesium sulfate or ammonium sulfate the ratio of dry weight of the salt to weight of the aqueous phase of the aqueous-in-oil emulsion composition is at least 0.25.

13. The aqueous-in-oil-in-aqueous double emulsion composition of any one of clauses 2 to 11, wherein the salt comprises magnesium sulfate or ammonium sulfate the ratio of dry weight of the salt to weight of the aqueous phase of the aqueous-in-oil emulsion composition is at least 0.3.

14. The aqueous-in-oil-in-aqueous double emulsion composition of any one of clauses 2 to 11, wherein the salt comprises magnesium sulfate or ammonium sulfate the ratio of dry weight of the salt to weight of the aqueous phase of the aqueous-in-oil emulsion composition is at least 0.35.

15. The aqueous-in-oil-in-aqueous double emulsion composition of any one of clauses 2 to 11, wherein the ratio of the dry weight of salt to the weight of water is selected from the group consisting of 0.05 or higher; or 0.1 or higher; or 0.2 or higher; or 0.3 or higher; or 0.35 or higher.

16. The aqueous-in-oil-in-aqueous double emulsion composition of any one of clauses 2 to 15, wherein the APCS comprises an active ingredient.

17. The aqueous-in-oil-in-aqueous double emulsion composition of clause 16, wherein the active ingredient comprises a molecular complex of an encapsulated volatile compound.

18. The aqueous-in-oil-in-aqueous double emulsion composition of clause 17, wherein the composition has the molecular complex of the encapsulated volatile compound distributed throughout the aqueous-in-oil emulsion composition.

19. The aqueous-in-oil-in-aqueous double emulsion composition of clause 17 or clause 18, wherein the ratio of dry weight of the salt to dry weight of the molecular complex of the encapsulated volatile compound is from 0.03 to 500.

20. The aqueous-in-oil-in-aqueous double emulsion composition of any one of clauses 17 to 19, wherein the molecular complex of an encapsulated volatile compound comprises a cyclopropene molecular encapsulating agent complex.

21. The aqueous-in-oil-in-aqueous double emulsion composition of clause 20, wherein the cyclopropene is of the formula:

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy.

22. The aqueous-in-oil-in-aqueous double emulsion composition of clause 20, wherein the cyclopropene is of the formula

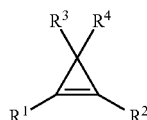

wherein $R^1$ is a substituted or unsubstituted $C_1$-$C_4$ alkyl, $C_2$-$C_4$ alkenyl, $C_2$-$C_4$ alkynyl, $C_3$-$C_6$ cycloalkyl, cycloalkylalkyl, phenyl, or napthyl group; and $R^2$, $R^3$, and $R^4$ are hydrogen.

23. The aqueous-in-oil-in-aqueous double emulsion composition of any one of clauses 20 to 22, wherein the cyclopropene is 1-methylcyclopropene (1-MCP).

24. The aqueous-in-oil-in-aqueous double emulsion composition of any one of clauses 20 to 23, wherein the molecular encapsulating agent is alpha-cyclodextrin.

25. The aqueous-in-oil-in-aqueous double emulsion composition of any one of clauses 20 to 24, wherein the double emulsion composition comprises at least 5%, at least 10%, at least 20%, at least 30%, at least 40%, at least 50%, or at least 60% by weight of a complex of 1-methylcyclopropene (1-MCP) and alpha-cyclodextrin.

26. The aqueous-in-oil-in-aqueous double emulsion composition of any one of clauses 1 to 25, wherein the aqueous-in-oil emulsion composition comprises an oil phase comprising an oil medium.

27. The aqueous-in-oil-in-aqueous double emulsion composition of clause 26, wherein the oil medium is selected from the group consisting of soybean oil, hydrogenated soybean oil, cotton seed oil, hydrogenated cotton seed oil, white mineral oil, hydrotreated middle petroleum distillate, hydrotreated light petroleum distillate, and combinations thereof.

28. The aqueous-in-oil-in-aqueous double emulsion composition of clause 26 or clause 27, wherein the aqueous-in-oil emulsion composition comprises 10-20%; 20-40%; 40-60%; 15-30%; or 30-55% by weight of the oil phase.

29. The aqueous-in-oil-in-aqueous double emulsion composition of any one of clauses 2 to 28, wherein the aqueous-in-oil emulsion composition comprises a lipophilic emulsifier.

30. The aqueous-in-oil-in-aqueous double emulsion composition of clause 29, wherein the lipophilic emulsifier is selected from the group consisting of polyglycerol polyricinoleate, lecithin, sorbitan fatty esters, and combinations thereof.

31. The aqueous-in-oil-in-aqueous double emulsion composition of clause 29 or clause 30, wherein the lipophilic emulsifier is polyglycerol polyricinoleate (PGPR).

32. The aqueous-in-oil-in-aqueous double emulsion composition of any one of clauses 2 to 28, wherein the aqueous-in-oil emulsion composition comprises an oil soluble thickener.

33. The aqueous-in-oil-in-aqueous double emulsion composition of clause 32, wherein the oil soluble thickener is selected from the group consisting of natural rubber, polypropylene, polyisoprene, polybutadiene, poly(styrene-butadiene), poly(ethylene-propylene-diene), polyurethane, polymethacrylate, polyisobutylene, poly(isobutylene-succinic acid), poly(isobutylene-succinic acid-polyacrylamide), polyurea, polyethylene, and combinations thereof.

34. The aqueous-in-oil-in-aqueous double emulsion composition of clause 32 or clause 33, wherein the oil soluble thickener is a (co- or homo)polymer of propylene.

35. The aqueous-in-oil-in-aqueous double emulsion composition of any one of clauses 1 to 34, wherein the second aqueous phase comprises water.

36. The aqueous-in-oil-in-aqueous double emulsion composition of clause 35, wherein water is present at a ratio of aqueous-in-oil emulsion composition:water from 1:1 to 1:100.

37. The aqueous-in-oil-in-aqueous double emulsion composition of any one of clauses 1 to 36, wherein the hydrophilic emulsifier is present in the second aqueous phase.

38. The aqueous-in-oil-in-aqueous double emulsion composition of any one of clauses 1 to 37, wherein the hydrophilic emulsifier is selected from the group consisting of cellulosics, gums, polysaccharides, clays, and combinations thereof.

39. The aqueous-in-oil-in-aqueous double emulsion composition of any one of clauses 1 to 37, wherein the hydrophilic emulsifier is hydroxyethyl cellulose.

40. The aqueous-in-oil-in-aqueous double emulsion composition of any one of clauses 1 to 39, wherein the surfactant is present in the second aqueous phase.

41. The aqueous-in-oil-in-aqueous double emulsion composition of any one of clauses 1 to 40, wherein the surfactant is a non-ionic surfactant.

42. The aqueous-in-oil-in-aqueous double emulsion composition of any one of clauses 1 to 41, wherein the surfactant is selected from the group consisting of poly(vinyl alcohol), poly(acrylic acid), poly(acrylamide), sodium caseinate, whey protein isolate (WPI), polysaccharide, copolymers of ethylene glycol and propylene glycol (e.g. Pluronic), polyoxyethylene derivatives of sorbitan monolaureate (e.g. polysorbate 20, polysorbate 80) and combinations thereof.

43. The aqueous-in-oil-in-aqueous double emulsion composition of any one of clauses 1 to 42, wherein the surfactant has a hydrophilic/lipophilic balance (HLB) of between 10-15.

44. The aqueous-in-oil-in-aqueous double emulsion composition of any one of clauses 1 to 42, wherein the surfactant has an HLB of about 12.

45. The aqueous-in-oil-in-aqueous double emulsion composition of any one of clauses 1 to 42, wherein the surfactant has an HLB of about 12.3.

46. The aqueous-in-oil-in-aqueous double emulsion composition of any one of clauses 1 to 42, wherein the surfactant has an HLB of about 13.

47. The aqueous-in-oil-in-aqueous double emulsion composition of any one of clauses 1 to 42, wherein the surfactant has an HLB of about 13.8.

48. The aqueous-in-oil-in-aqueous double emulsion composition of any one of clauses 1 to 42, wherein the surfactant has an HLB of about 14.

49. The aqueous-in-oil-in-aqueous double emulsion composition of any one of clauses 1 to 42, wherein the surfactant has an HLB of about 14.4.

50. The aqueous-in-oil-in-aqueous double emulsion composition of any one of clauses 1 to 42, wherein the surfactant has an HLB of about 15.

51. The aqueous-in-oil-in-aqueous double emulsion composition of any one of clauses 1 to 50, wherein the surfactant is an aqueous salt solution of a styrene-maleic anhydride copolymer.

52. The aqueous-in-oil-in-aqueous double emulsion composition of any one of clauses 1 to 50, wherein the surfactant is an aqueous salt solution of a partial ester of a styrene-maleic anhydride copolymer.

53. The aqueous-in-oil-in-aqueous double emulsion composition of any one of clauses 1 to 52, wherein the by weight percentage (%) does not consider the second aqueous phase.

54. The aqueous-in-oil-in-aqueous double emulsion composition of any one of clauses 1 to 53 formulated as a sprayable formulation.

55. The aqueous-in-oil-in-aqueous double emulsion composition of clause 54, wherein the formulation is diluted with a solvent.

56. The aqueous-in-oil-in-aqueous double emulsion composition of clause 55, wherein the solvent comprises water.

57. The aqueous-in-oil-in-aqueous double emulsion composition of clause 55 or clause 56, wherein the solvent comprises sodium caseinate (NaCSn), lactose, or a combination thereof.

58. A method for preparing an aqueous-in-oil-in-aqueous double emulsion composition, comprising:
(a) preparing an aqueous-in-oil emulsion composition using an aqueous phase, an oil phase, a lipophilic emulsifier, and an oil soluble thickener;
(b) combining an active ingredient into the aqueous-in-oil emulsion composition; and
(c) dispersing the aqueous-in-oil emulsion composition into a second aqueous phase.

59. The method for preparing an aqueous-in-oil-in-aqueous double emulsion composition of clause 58, wherein the aqueous-in-oil emulsion composition comprises an aqueous phase containing salt (APCS).

60. The method for preparing an aqueous-in-oil-in-aqueous double emulsion composition of clause 59, wherein the APCS comprises water.

61. The method for preparing an aqueous-in-oil-in-aqueous double emulsion composition of clause 60, wherein the APCS comprises water at an amount selected from the group consisting of more than 20% water by weight, more than 30% water by weight, more than 50% water by weight, and more than 60% water by weight (based on the weight of the composition).

62. The method for preparing an aqueous-in-oil-in-aqueous double emulsion composition of any one of clauses 59 to 61, wherein the APCS comprises one or more salts.

63. The method for preparing an aqueous-in-oil-in-aqueous double emulsion composition of any one of clauses 59 to 62, wherein no chloride salt is used.

64. The method for preparing an aqueous-in-oil-in-aqueous double emulsion composition of any one of clauses 59 to 63, wherein the salt is a non-deliquescent salt.

65. The method for preparing an aqueous-in-oil-in-aqueous double emulsion composition of any one of clauses 59 to 64, wherein the salt is dissolved in the aqueous phase.

66. The method for preparing an aqueous-in-oil-in-aqueous double emulsion composition of any one of clauses 59 to 65, wherein the salt comprises magnesium sulfate or ammonium sulfate.
67. The method for preparing an aqueous-in-oil-in-aqueous double emulsion composition of any one of clauses 59 to 65, wherein the salt comprises magnesium sulfate. 68. The method for preparing an aqueous-in-oil-in-aqueous double emulsion composition of any one of clauses 59 to 65, wherein the salt comprises ammonium sulfate.
69. The method for preparing an aqueous-in-oil-in-aqueous double emulsion composition of any one of clauses 59 to 68, wherein the salt comprises magnesium sulfate or ammonium sulfate the ratio of dry weight of the salt to weight of the aqueous phase of the aqueous-in-oil emulsion composition is at least 0.25.
70. The method for preparing an aqueous-in-oil-in-aqueous double emulsion composition of any one of clauses 59 to 68, wherein the salt comprises magnesium sulfate or ammonium sulfate the ratio of dry weight of the salt to weight of the aqueous phase of the aqueous-in-oil emulsion composition is at least 0.3.
71. The method for preparing an aqueous-in-oil-in-aqueous double emulsion composition of any one of clauses 59 to 68, wherein the salt comprises magnesium sulfate or ammonium sulfate the ratio of dry weight of the salt to weight of the aqueous phase of the aqueous-in-oil emulsion composition is at least 0.35.
72. The method for preparing an aqueous-in-oil-in-aqueous double emulsion composition of any one of clauses 59 to 71, wherein the ratio of the dry weight of salt to the weight of water is selected from the group consisting of 0.05 or higher; or 0.1 or higher; or 0.2 or higher; or 0.3 or higher; or 0.35 or higher.
73. The method for preparing an aqueous-in-oil-in-aqueous double emulsion composition of any one of clauses 58 to 72, wherein the active ingredient comprises a molecular complex of an encapsulated volatile compound.
74. The method for preparing an aqueous-in-oil-in-aqueous double emulsion composition of clause 73, wherein the composition has the molecular complex of the encapsulated volatile compound distributed throughout the aqueous-in-oil emulsion composition.
75. The method for preparing an aqueous-in-oil-in-aqueous double emulsion composition of clause 73 or 74, wherein the ratio of dry weight of the salt to dry weight of the molecular complex of the encapsulated volatile compound is from 0.03 to 500.
76. The method for preparing an aqueous-in-oil-in-aqueous double emulsion composition of any one of clauses 73 to 75, wherein the molecular complex of an encapsulated volatile compound comprises a cyclopropene molecular encapsulating agent complex.
77. The method for preparing an aqueous-in-oil-in-aqueous double emulsion composition of clause 76, wherein the cyclopropene is of the formula:

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy.
78. The method for preparing an aqueous-in-oil-in-aqueous double emulsion composition of clause 76, wherein the cyclopropene is of the formula

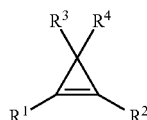

wherein $R^1$ is a substituted or unsubstituted $C_1$-$C_4$ alkyl, $C_2$-$C_4$ alkenyl, $C_2$-$C_4$ alkynyl, $C_3$-$C_6$ cycloalkyl, cycloalkylalkyl, phenyl, or napthyl group; and $R^2$, $R^3$, and $R^4$ are hydrogen.
79. The method for preparing an aqueous-in-oil-in-aqueous double emulsion composition of clause 76, wherein the cyclopropene is 1-methylcyclopropene.
80. The method for preparing an aqueous-in-oil-in-aqueous double emulsion composition of clause 76, wherein the molecular encapsulating agent is alpha-cyclodextrin.
81. The method for preparing an aqueous-in-oil-in-aqueous double emulsion composition of any one of clauses 73 to 80, wherein the double emulsion composition comprises at least 5%, at least 10%, at least 20%, at least 30%, at least 40%, at least 50%, or at least 60% by weight of a complex of 1-methylcyclopropene (1-MCP) and alpha-cyclodextrin.
82. The method for preparing an aqueous-in-oil-in-aqueous double emulsion composition of any one of clauses 58 to 81, wherein the oil phase comprises an oil medium.
83. The method for preparing an aqueous-in-oil-in-aqueous double emulsion composition of clause 82, wherein the oil medium is selected from the group consisting of soybean oil, hydrogenated soybean oil, cotton seed oil, hydrogenated cotton seed oil, white mineral oil, hydrotreated middle petroleum distillate, hydrotreated light petroleum distillate, and combinations thereof.
84. The method for preparing an aqueous-in-oil-in-aqueous double emulsion composition of any one of clauses 58 to 83, wherein the aqueous-in-oil emulsion composition comprises 10-20%; 20-40%; 40-60%; 15-30%; or 30-55% by weight of the oil phase.
85. The method for preparing an aqueous-in-oil-in-aqueous double emulsion composition of any one of clauses 58 to 84, wherein the lipophilic emulsifier is selected from the group consisting of polyglycerol polyricinoleate, lecithin, sorbitan fatty esters, and combinations thereof.
86. The method for preparing an aqueous-in-oil-in-aqueous double emulsion composition of clause 85, wherein the lipophilic emulsifier is polyglycerol polyricinoleate (PGPR).
87. The method for preparing an aqueous-in-oil-in-aqueous double emulsion composition of any one of clauses 58 to 86, wherein the oil soluble thickener is selected from the group consisting of natural rubber, polypropylene, polyisoprene, polybutadiene, poly(styrene-butadiene), poly(ethylene-propylene-diene), polyurethane, polymethacrylate, polyisobutylene, poly(isobutylene-succinic acid), poly(isobutylene-succinic acid-polyacrylamide), polyurea, polyethylene, and combinations thereof.

88. The method for preparing an aqueous-in-oil-in-aqueous double emulsion composition of clause 87, wherein the oil soluble thickener is a (co- or homo)polymer of propylene.

89. The method for preparing an aqueous-in-oil-in-aqueous double emulsion composition of any one of clauses 58 to 88, wherein the second aqueous phase comprises water.

90. The method for preparing an aqueous-in-oil-in-aqueous double emulsion composition of clause 89, water is present at a ratio of aqueous-in-oil emulsion composition:water from 1:1 to 1:100.

91. The method for preparing an aqueous-in-oil-in-aqueous double emulsion composition of any one of clauses 58 to 90, wherein the method further comprises addition of a hydrophilic emulsifier to the second aqueous phase.

92. The method for preparing an aqueous-in-oil-in-aqueous double emulsion composition of clause 91, wherein the hydrophilic emulsifier is selected from the group consisting of cellulosics, gums, polysaccharides, clays, and combinations thereof.

93. The method for preparing an aqueous-in-oil-in-aqueous double emulsion composition of clause 91, wherein the hydrophilic emulsifier is hydroxyethyl cellulose.

94. The method for preparing an aqueous-in-oil-in-aqueous double emulsion composition of any one of clauses 58 to 93, wherein the method further comprises addition of a surfactant to the second aqueous phase.

95. The method for preparing an aqueous-in-oil-in-aqueous double emulsion composition of clause 94, wherein the surfactant is a non-ionic surfactant.

96. The method for preparing an aqueous-in-oil-in-aqueous double emulsion composition of clause 94, wherein the surfactant is selected from the group consisting of poly(vinyl alcohol), poly(acrylic acid), poly(acrylamide), sodium caseinate, whey protein isolate (WPI), polysaccharide, copolymers of ethylene glycol and propylene glycol (e.g. Pluronic), polyoxyethylene derivatives of sorbitan monolaureate (e.g. polysorbate 20, polysorbate 80) and combinations thereof.

97. The method for preparing an aqueous-in-oil-in-aqueous double emulsion composition of any one of clauses 94 to 96, wherein the surfactant has a hydrophilic/lipophilic balance (HLB) of between 10-15.

98. The method for preparing an aqueous-in-oil-in-aqueous double emulsion composition of any one of clauses 94 to 96, wherein the surfactant has an HLB of about 12.

99. The method for preparing an aqueous-in-oil-in-aqueous double emulsion composition of any one of clauses 94 to 96, wherein the surfactant has an HLB of about 12.3.

100. The method for preparing an aqueous-in-oil-in-aqueous double emulsion composition of any one of clauses 94 to 96, wherein the surfactant has an HLB of about 13.

101. The method for preparing an aqueous-in-oil-in-aqueous double emulsion composition of any one of clauses 94 to 96, wherein the surfactant has an HLB of about 13.8.

102. The method for preparing an aqueous-in-oil-in-aqueous double emulsion composition of any one of clauses 94 to 96, wherein the surfactant has an HLB of about 14.

103. The method for preparing an aqueous-in-oil-in-aqueous double emulsion composition of any one of clauses 94 to 96, wherein the surfactant has an HLB of about 14.4.

104. The method for preparing an aqueous-in-oil-in-aqueous double emulsion composition of any one of clauses 94 to 96, wherein the surfactant has an HLB of about 15.

105. The method for preparing an aqueous-in-oil-in-aqueous double emulsion composition of any one of clauses 94 to 104, wherein the surfactant is an aqueous salt solution of a styrene-maleic anhydride copolymer.

106. The method for preparing an aqueous-in-oil-in-aqueous double emulsion composition of any one of clauses 94 to 104, wherein the surfactant is an aqueous salt solution of a partial ester of a styrene-maleic anhydride copolymer.

107. The method for preparing an aqueous-in-oil-in-aqueous double emulsion composition of any one of clauses 58 to 106, wherein the by weight % does not consider the second aqueous phase.

108. A method of treating plants or plant parts comprising the step of contacting the plant or plant parts with the aqueous-in-oil-in-aqueous double emulsion of any one of clauses 1 to 57.

In one aspect, an aqueous-in-oil-in-aqueous double emulsion composition is provided. The aqueous-in-oil-in-aqueous double emulsion composition comprises (a) an aqueous-in-oil emulsion composition; (b) a hydrophilic emulsifier; (c) a surfactant; and (d) a second aqueous phase.

In another aspect, a method for preparing an aqueous-in-oil-in-aqueous double emulsion composition is provided. The method comprises (a) preparing an aqueous-in-oil emulsion composition using an aqueous phase, an oil phase, a lipophilic emulsifier, and an oil soluble thickener; (b) combining an active ingredient into the aqueous-in-oil emulsion composition; and (c) dispersing the aqueous-in-oil emulsion composition into a second aqueous phase.

In yet another aspect, a method of treating plants or plant parts is provided. The method of treating plants or plant parts comprises the step of contacting the plant or plant parts with an aqueous-in-oil-in-aqueous double emulsion as described herein.

BRIEF DESCRIPTION OF THE DRAWING

FIG. 1 shows a schematic of the primary water-in-oil (W/O) emulsion disclosed and the water-in-oil-in-water (W/O/W) double emulsion disclosed herein.

DETAILED DESCRIPTION

As used herein, the phrase "stable" refer to cyclopropene content at ambient temperature over time, for example after one (1) year, in a solution with no more than 15% loss as compared to day zero (0). Alternatively, the solution may be tested at 54° C. with no more than 15% loss over a period of time, for example one week or four weeks. When the cyclopropene content is maintained over a period of time, the solution is a "stable" cyclopropene formulation or cyclopropene solution.

In one embodiment, the cyclopropene content of the composition provided is stable over a period of at least ten (10), twenty (20), thirty (30), or sixty (60) days. In another embodiment, the cyclopropene content of the composition is stable over a period of one month, two months, three months, six months, or twelve months. In another embodiment, the cyclopropene content of the composition is stable over a period of one year, two years, or three years.

A water-in-oil-in-water type (W/O/W) double emulsion is a compartmented structure consisting of small aqueous droplets embedded within larger oil droplets, which themselves are dispersed within an external aqueous phase. The double emulsion composition may have at least one of the following advantages: (a) high capacity of entrapment of hydrophilic compounds; (b) ability to introduce incompatible substances into the same system; (c) performance improvement of active compounds; and (d) protection and sustained release of chemical substances initially entrapped in the internal droplets.

Cyclopropene compositions comprising water and salt have been described in U.S. Pat. No. 8,691,728, the content of which is thereby incorporated by reference in its entirety.

When a compound is described herein as being present as a gas in an atmosphere at a certain concentration using the unit "ppm," the concentration is given as parts by volume of that compound per million parts by volume of the atmosphere. Similarly, "ppb" denotes parts by volume of that compound per billion parts by volume of the atmosphere.

The practice of the present disclosure optionally involves the use of one or more cyclopropene compound. As used herein, a cyclopropene compound is any compound with the formula

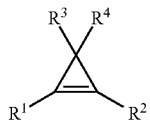

where each $R^1$, $R^2$, $R^3$ and $R^4$ is independently selected from the group consisting of H and a chemical group of the formula:

-(L)$_n$-Z where n is an integer from 0 to 12. Each L is a bivalent radical. Suitable L groups include, for example, radicals containing one or more atoms selected from B, C, N, O, P, S, Si, or mixtures thereof. The atoms within an L group may be connected to each other by single bonds, double bonds, triple bonds, or mixtures thereof. Each L group may be linear, branched, cyclic, or a combination thereof. In any one R group (i.e., any one of $R^1$, $R^2$, $R^3$ and $R^4$) the total number of heteroatoms (i.e., atoms that are neither H nor C) is from 0 to 6. Independently, in any one R group the total number of non-hydrogen atoms is 50 or less. Each Z is a monovalent radical. Each Z is independently selected from the group consisting of a $C_1$-$C_8$ alkyl, hydrogen, halo, cyano, nitro, nitroso, azido, chlorate, bromate, iodate, isocyanato, isocyanido, isothiocyanato, pentafluorothio, and a chemical group G, wherein G is a 3- to 14-membered ring system.

The $R^1$, $R^2$, $R^3$, and $R^4$ groups are independently selected from the suitable groups. Among the groups that are suitable for use as one or more of $R^1$, $R^2$, $R^3$, and $R^4$ are, for example, aliphatic groups, aliphatic-oxy groups, alkylphosphonato groups, cycloaliphatic groups, cycloalkylsulfonyl groups, cycloalkylamino groups, heterocyclic groups, aryl groups, heteroaryl groups, halogens, silyl groups, and mixtures and combinations thereof. Groups that are suitable for use as one or more of $R^1$, $R^2$, $R^3$, and $R^4$ may be substituted or unsubstituted.

Among the suitable $R^1$, $R^2$, $R^3$, and $R^4$ groups are, for example, aliphatic groups. Some suitable aliphatic groups include, for example, alkyl, alkenyl, and alkynyl groups. Suitable aliphatic groups may be linear, branched, cyclic, or a combination thereof. Independently, suitable aliphatic groups may be substituted or unsubstituted.

As used herein, a chemical group of interest is said to be "substituted" if one or more hydrogen atoms of the chemical group of interest is replaced by a substituent.

Also among the suitable $R^1$, $R^2$, $R^3$, and $R^4$ groups are, for example, substituted and unsubstituted heterocyclyl groups that are connected to the cyclopropene compound through an intervening oxy group, amino group, carbonyl group, or sulfonyl group; examples of such $R^1$, $R^2$, $R^3$, and $R^4$ groups are heterocyclyloxy, heterocyclylcarbonyl, diheterocyclylamino, and diheterocyclylamino sulfonyl.

Also among the suitable $R^1$, $R^2$, $R^3$, and $R^4$ groups are, for example, substituted and unsubstituted heterocyclic groups that are connected to the cyclopropene compound through an intervening oxy group, amino group, carbonyl group, sulfonyl group, thioalkyl group, or aminosulfonyl group; examples of such $R^1$, $R^2$, $R^3$, and $R^4$ groups are diheteroarylamino, heteroarylthioalkyl, and diheteroarylaminosulfonyl.

Also among the suitable $R^1$, $R^2$, $R^3$, and $R^4$ groups are, for example, hydrogen, fluoro, chloro, bromo, iodo, cyano, nitro, nitroso, azido, chlorate, bromate, iodate, isocyanato, isocyanido, isothiocyanato, pentafluorothio, acetoxy, carboethoxy, cyanato, nitrato, nitrito, perchlorato, allenyl, butylmercapto, diethylphosphonato, dimethylphenylsilyl, isoquinolyl, mercapto, naphthyl, phenoxy, phenyl, piperidino, pyridyl, quinolyl, triethylsilyl, trimethylsilyl, and substituted analogs thereof.

As used herein, the chemical group G is a 3- to 14-membered ring system. Ring systems suitable as chemical group G may be substituted or unsubstituted; they may be aromatic (including, for example, phenyl and napthyl) or aliphatic (including unsaturated aliphatic, partially saturated aliphatic, or saturated aliphatic); and they may be carbocyclic or heterocyclic. Among heterocyclic G groups, some suitable heteroatoms are, for example, nitrogen, sulfur, oxygen, and combinations thereof. Ring systems suitable as chemical group G may be monocyclic, bicyclic, tricyclic, polycyclic, spiro, or fused; among suitable chemical group G ring systems that are bicyclic, tricyclic, or fused, the various rings in a single chemical group G may be all the same type or may be of two or more types (for example, an aromatic ring may be fused with an aliphatic ring).

In one embodiment, one or more of $R^1$, $R^2$, $R^3$, and $R^4$ is hydrogen or $C_1$-$C_{10}$ alkyl. In another embodiment, each of $R^1$, $R^2$, $R^3$, and $R^4$ is hydrogen or a $C_1$-$C_8$ alkyl. In another embodiment, each of $R^1$, $R^2$, $R^3$, and $R^4$ is hydrogen or $C_1$-$C_4$ alkyl. In another embodiment, each of $R^1$, $R^2$, $R^3$, and $R^4$ is hydrogen or methyl. In another embodiment, $R^1$ is $C_1$-$C_4$ alkyl and each of $R^2$, $R^3$, and $R^4$ is hydrogen. In another embodiment, $R^1$ is methyl and each of $R^2$, $R^3$, and $R^4$ is hydrogen, and the cyclopropene compound is known herein as 1-methylcyclopropene or "1-MCP."

Various embodiments of the invention are described herein as follows. In one aspect of the present disclosure, an aqueous-in-oil-in-aqueous double emulsion composition is provided. The aqueous-in-oil-in-aqueous double emulsion composition comprises (a) an aqueous-in-oil emulsion composition; (b) a hydrophilic emulsifier; (c) a surfactant; and (d) a second aqueous phase. In certain embodiments, the aqueous-in-oil emulsion composition comprises an aqueous phase containing salt (APCS). In some embodiments, the APCS comprises water. In certain embodiments, the APCS contains more than 20% water by weight, based on the weight of the composition. Some embodiments have water in an amount, by weight based on the weight of the composition, of 30% or more; 50% or more; or 60% or more.

Also contemplated are embodiments in which the composition of the present invention is present in a formulation that contains more than 30% by weight, based on the weight of the formulation, a liquid that contains at least one compound other than water. Such a liquid may have no water. In some embodiments, such a liquid may be a mixture of water and one or more water miscible liquids other than water. In such a mixture, the amount of water, by weight based on the weight of the liquid, may be 99% or less; or 95% or less; 90% or less; or 50% or less; or 10% or less. Independently, in such a mixture, the amount of water, by weight based on the weight of the liquid, may be 5% or more; or 45% or more; or 75% or more.

In certain embodiments, the APCS comprises one or more salts. As used herein, a salt is an ionic compound comprising at least one anion and at least one cation. A salt may be present as an ionic solid or as a solution in water. Some suitable anions are, for example, the anion residues of acids that have pKa values of 5 or lower. Some suitable salts, for example, are compounds that, regardless of the method used to actually make them, have the structure of a compound that would be formed by substituting a cation that is not a hydrogen ion for the hydrogen ion in an acid that has a pKa of 5 or lower; an acid that has a pKa of 2.5 or lower; or an acid that has a pKa of 1.0 or lower.

In some embodiments, one or more salt is used that is suitable for treating agricultural plants. Independently, in some embodiments, one or more salt is used that has solubility in water at 25° C. at 1 atmosphere pressure, per 100 mL of water, of 1 gram or more, or 3 grams or more, or 10 grams or more, or 20 grams or more, or 30 grams or more.

Some non-limiting examples of suitable anions are these: acetate, chloride, nitrate, phosphate, or sulfate. Independently, some non-limiting examples of suitable cations are these: ammonium, calcium, magnesium, manganese, potassium, or sodium. It is contemplated that suitable cations and suitable anions may be used in any combination or mixture, with the provision that at least one salt is used that is not calcium chloride.

In some embodiments, no appreciable amount of calcium chloride is present in the composition of the present invention. It is contemplated that a finite but non-appreciable amount of calcium chloride may be present in a composition of the present invention (for example, because of one or more impurities). Calcium chloride may be present with a ratio of dry weight of calcium chloride to dry weight of total salt of 0.03 or less; or 0.01 or less; or 0.003 or less; or 0.001 or less; or zero.

In some embodiments, one or more salt is used that is selected from ammonium acetate, ammonium chloride, ammonium nitrate, ammonium phosphate, ammonium sulfate, calcium acetate, magnesium acetate, magnesium chloride, magnesium sulfate, manganese nitrate, potassium acetate, potassium chloride, potassium phosphate, potassium sulfate, sodium acetate, sodium chloride, sodium phosphate, or sodium sulfate. In some embodiments, one or more salt is used that is selected from ammonium acetate, ammonium chloride, ammonium sulfate, magnesium acetate, magnesium chloride, magnesium sulfate, potassium acetate, potassium chloride, potassium phosphate, sodium acetate, sodium chloride, disodium phosphate, or sodium sulfate. In some embodiments, one or more salt is used that is selected from ammonium chloride, ammonium sulfate, magnesium sulfate, sodium acetate, sodium chloride, disodium phosphate, or sodium sulfate. Mixtures of suitable salts are also suitable. In one embodiment, the salt comprises magnesium sulfate or ammonium sulfate.

In some embodiments, one or more sulfate salt is used. Independently, in some embodiments, no chloride salt is used.

In the practice of the present invention, some embodiments of the present invention contain at least one non-deliquescent salt. A non-deliquescent salt is a salt that is not a deliquescent salt. A deliquescent salt is a salt that, in its solid form, readily absorbs large amounts of water from the atmosphere. At 25° C. and 1 atmosphere pressure, if relative humidity is not zero, a deliquescent salt will absorb sufficient water from the atmosphere to form a liquid solution. Some known deliquescent salts are, for example, ammonium formate; calcium chloride; magnesium chloride; potassium phosphate, monobasic; and potassium phosphate, dibasic. Some embodiments of the present invention do not contain appreciable amounts of any deliquescent salt. It is contemplated that a finite but non-appreciable amount of deliquescent salt may be present in a embodiment of the present invention (for example, because of one or more impurities). Deliquescent salt may be present in a ratio of dry weight of deliquescent salt to dry weight of total salt of 0.01 or lower; or 0.001 or lower; or zero.

In some embodiments, the ratio of the weight of salt to the weight of cyclopropene molecular encapsulating agent complex is 0.01 or greater; or 0.03 or greater; or 0.1 or greater; or 0.3 or greater; or 1 or greater. Independently, in some embodiments, the ratio of the weight of salt to the weight of cyclopropene molecular encapsulating agent complex is 200 or less; or 100 or less; or 50 or less; or 20 or less.

In yet another aspect, the salt is dissolved in the aqueous phase. In certain embodiments, the salt comprises magnesium sulfate or ammonium sulfate. In other embodiments, the salt comprises magnesium sulfate. In yet other embodiments, the salt comprises ammonium sulfate.

In compositions of the present invention, the ratio of the dry weight of salt to the dry weight of cyclopropene molecular encapsulating agent complex is 0.03 or higher; or 0.1 or higher; or 0.3 or higher; or 1 or higher. Independently, in compositions of the present invention, the ratio of the dry weight of salt to the dry weight of cyclopropene molecular encapsulating agent complex is 500 or lower; or 200 or lower; or 100 or lower; or 50 or lower; or 20 or lower.

In some embodiments, the composition of the present invention contains more than 20% water by weight, based on the weight of the composition. Some embodiments have water in an amount, by weight based on the weight of the composition, of 30% or more; 50% or more; or 60% or more.

In some embodiments, the ratio of the dry weight of salt to the weight of water is 0.05 or higher; or 0.1 or higher; or 0.2 or higher; or 0.3 or higher; or 0.35 or higher. In one embodiment, the salt comprises magnesium sulfate or ammonium sulfate the ratio of dry weight of the salt to weight of the aqueous phase of the aqueous-in-oil emulsion composition is at least 0.25. In another embodiment, the salt comprises magnesium sulfate or ammonium sulfate the ratio of dry weight of the salt to weight of the aqueous phase of the aqueous-in-oil emulsion composition is at least 0.3. In yet another embodiment, the salt comprises magnesium sulfate or ammonium sulfate the ratio of dry weight of the salt to weight of the aqueous phase of the aqueous-in-oil emulsion composition is at least 0.35. In some embodiments, the ratio of the dry weight of salt to the weight of water is selected from the group consisting of 0.05 or higher; or 0.1 or higher; or 0.2 or higher; or 0.3 or higher; or 0.35 or higher.

Independently, in some embodiments, the ratio of the dry weight of salt to the weight of water is 0.6 or lower; or 0.5 or lower.

In some embodiments, the ratio of the dry weight of cyclopropene molecular encapsulating complex to the sum of the weight of water and the weight of salt is 0.005 or higher; or 0.01 or higher; or 0.02 or higher; or 0.05 or higher; or 0.1 or higher; or 0.2 or higher. Independently, in some embodiments, the ratio of the dry weight of cyclopropene molecular encapsulating complex to the sum of the weight of water and the weight of salt is 0.65 or lower; or 0.45 or lower; or 0.3 or lower.

In some embodiments, at least one cyclopropene molecular encapsulating complex is distributed throughout the water. Independently, in some embodiments, at least one salt is dissolved in the water.

In some embodiments, the ratio of the dry weight of salt to the weight of water is selected from the group consisting of 0.05 or higher; or 0.1 or higher; or 0.2 or higher; or 0.3 or higher; or 0.35 or higher.

In one embodiment, the active ingredient is dispersed in the aqueous phrase. In another embodiment, the active ingredient comprises a molecular complex of an encapsulated volatile compound. In another embodiment, the ratio of dry weight of the salt to weight of the first aqueous phase is at least 0.25; at least 0.3; or at least 0.35.

In certain aspects, the APCS comprises an active ingredient. In some embodiments, the active ingredient comprises a molecular complex of an encapsulated volatile compound. In certain embodiments, the composition has the molecular complex of the encapsulated volatile compound distributed throughout the aqueous-in-oil emulsion composition. In some aspects, the ratio of dry weight of the salt to dry weight of the molecular complex of the encapsulated volatile compound is from 0.03 to 500.

In some embodiments, the molecular complex of an encapsulated volatile compound comprises a cyclopropene molecular encapsulating agent complex. In certain aspects, molecular complex of the encapsulated volatile compound is distributed throughout the aqueous phase. In some aspects, the cyclopropene is of the formula:

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy. In one embodiment, R is a $C_1$-$C_8$ alkyl. In another embodiment, R is methyl.

In other embodiments, the cyclopropene is of the formula:

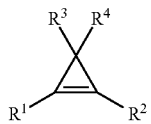

wherein $R^1$ is a substituted or unsubstituted $C_1$-$C_4$ alkyl, $C_2$-$C_4$ alkenyl, $C_2$-$C_4$ alkynyl, $C_3$-$C_6$ cycloalkyl, cycloalkylalkyl, phenyl, or napthyl group; and $R^2$, $R^3$, and $R^4$ are hydrogen.

In certain aspects, the cyclopropene is 1-methylcyclopropene (1-MCP). In another embodiment, the molecular encapsulating agent is selected from the group consisting of substituted cyclodextrins, unsubstituted cyclodextrins, and combinations thereof. In a further embodiment, the molecular encapsulating agent comprises alpha-cyclodextrin.

In one embodiment, the solid particles comprise at least 5%, at least 10%, at least 20%, at least 30%, at least 40%, at least 50%, or at least 60% by weight of the composition. In another embodiment, the solid particles comprise 10-20%, 10-30%, 10-40%, 10-50%, 10-60%, 20-40%, 30-60%, or 40-60% by weight of the composition. In another embodiment, the composition comprises at least 5%, at least 10%, at least 20%, at least 30%, at least 40%, at least 50%, or at least 60% by weight of a complex of 1-methylcyclopropene (1-MCP) and alpha-cyclodextrin. In another embodiment, the composition comprises 10-20%, 10-30%, 10-40%, 10-50%, 10-60%, 20-40%, 30-60%, or 40-60% by weight of a complex of 1-methylcyclopropene (1-MCP) and alpha-cyclodextrin.

When a cyclopropene compound is used, in some embodiments the concentration of the cyclopropene compound in the atmosphere is 0.5 ppb or higher; 1 ppb or higher; 10 ppb or higher; or 100 ppb or higher. In some embodiments, the concentration of the cyclopropene compound is 100 ppm or lower, 50 ppm or lower, 10 ppm or lower, or 5 ppm or lower.

In some embodiments, a cyclopropene is used that has boiling point at one atmosphere pressure of 50° C. or lower; 25° C. or lower; or 15° C. or lower. Independently, in some embodiments, a cyclopropene is used that has boiling point at one atmosphere pressure of −100° C. or higher; −50° C. or higher; −25° C. or higher; or 0° C. or higher.

The cyclopropenes applicable to this invention may be prepared by any method. Some suitable methods of preparation of cyclopropenes are the processes disclosed in U.S. Pat. Nos. 5,518,988 and 6,017,849.

In some embodiments, at least one molecular encapsulating agent is used to encapsulate at least one volatile compound. In some embodiments, at least one molecular encapsulating agent encapsulates one or more cyclopropene or a portion of one or more cyclopropene. A complex that contains a cyclopropene molecule or a portion of a cyclopropene molecule encapsulated in a molecule of a molecular encapsulating agent is known herein as a "cyclopropene molecular encapsulating agent complex."

In some embodiments, at least one cyclopropene molecular encapsulating agent complex forms an inclusion complex. In such an inclusion complex, the molecular encapsulating agent forms a cavity, and the cyclopropene or a portion of the cyclopropene is located within that cavity. In some of such inclusion complexes, there is no covalent bonding between the cyclopropene and the molecular encapsulating agent. Independently, in some of such inclusion complexes, there is no ionic bonding between the cyclopropene and the molecular encapsulating complex, whether or not there is any electrostatic attraction between one or more polar moiety in the cyclopropene and one or more polar moiety in the molecular encapsulating agent.

In some embodiments of the inclusion complexes, the interior of the cavity of the molecular encapsulating agent is substantially apolar or hydrophobic or both, and the cyclopropene (or the portion of the cyclopropene located within that cavity) is also substantially apolar or hydrophobic or both. While the present invention is not limited to any particular theory or mechanism, it is contemplated that, in such apolar cyclopropene molecular encapsulating agent complexes, van der Waals forces, or hydrophobic interactions, or both, cause the cyclopropene molecule or portion thereof to remain within the cavity of the molecular encapsulating agent.

The cyclopropene molecular encapsulation agent complexes can be prepared by various means. For one example, such complexes are prepared by contacting the cyclopropene with a solution or slurry of the molecular encapsulation agent and then isolating the complex, using processes disclosed in U.S. Pat. No. 6,017,849. For another example, in one method of making a complex in which 1-MCP is encapsulated in a molecular encapsulating agent, the 1-MCP gas is bubbled through a solution of alpha-cyclodextrin in water, from which the complex first precipitates and is then isolated by filtration. In some embodiments, complexes are made by the above method and, after isolation, are dried and stored in solid form, for example as a powder, for later addition to useful compositions.

The amount of molecular encapsulating agent can usefully be characterized by the ratio of moles of molecular encapsulating agent to moles of cyclopropene. In some embodiments, the ratio of moles of molecular encapsulating agent to moles of cyclopropene is 0.1 or larger; 0.2 or larger; 0.5 or larger; or 0.9 or larger. In some embodiments, the ratio of moles of molecular encapsulating agent to moles of cyclopropene is 2.0 or lower; 1.5 or lower; or 1.0 or lower.

Suitable molecular encapsulating agents include, for example, organic and inorganic molecular encapsulating agents. Suitable organic molecular encapsulating agents include, for example, substituted cyclodextrins, unsubstituted cyclodextrins, and crown ethers. Suitable inorganic molecular encapsulating agents include, for example, zeolites. Mixtures of suitable molecular encapsulating agents are also suitable. In some embodiments of the invention, the encapsulating agent is alpha-cyclodextrin, beta-cyclodextrin, gamma-cyclodextrin, or a mixture thereof. In some embodiments of the invention, alpha-cyclodextrin is used. The preferred encapsulating agent will vary depending upon the structure of the cyclopropene or cyclopropenes being used. A particular cyclodextrin or mixture of cyclodextrins, cyclodextrin polymers, modified cyclodextrins, or mixtures thereof can also be used.

In some aspects, the aqueous-in-oil emulsion composition comprises an oil phase comprising an oil medium. In some embodiments, the oil medium is selected from the group consisting of soybean oil, hydrogenated soybean oil, cotton seed oil, hydrogenated cotton seed oil, white mineral oil, hydrotreated middle petroleum distillate, hydrotreated light petroleum distillate, and combinations thereof. In a further embodiment, the white mineral oil comprises Blandol and/or Klearol. In another further embodiment, the hydrotreated middle petroleum distillate comprises Conosol 260, Unipar SH 260 CC, and/or Isopar V. In another further embodiment, the hydrotreated light petroleum distillate comprises Unipar SH 210 AS and/or Isopar M. In another embodiment, the lipophilic emulsifier or hydrophobic emulsifier is selected from the group consisting of polyglycerol polyricinoleate, lecithin, sorbitan fatty esters (e.g., Span 80), and combinations thereof. In another embodiment, the oil soluble thickener or hydrophilic emulsifier is selected from the group consisting of natural rubber, polypropylene, polyisoprene, polybutadiene, poly(styrene-butadiene), poly(ethylene-propylene-diene), polyurethane, polymethacrylate, polyisobutylene, poly(isobutylene-succinic acid), poly(isobutylene-succinic acid-polyacrylamide), polyurea, polyethylene, and combinations thereof. In a further embodiment, the polymeric thickener comprises a higher molecular weight component and a lower molecular weight component, characterized in that the thickener comprises a mixture of (1) a (co- or homo)polymer of propylene with a weight average molecular weight of more than 200,000 and (2) a (co- or homo)polymer of propylene with a weight average molecular weight of less than 200,000. In another embodiment, the oil soluble thickener or hydrophilic emulsifier is selected from the group consisting of poly(vinyl alcohol), poly(acrylic acid), poly(acrylamide), sodium caseinate, whey protein isolate (WPI), polysaccharide, and combinations thereof.

In another embodiment, the polymeric thickener comprises a high molecular component comprising a (co- or homo)polymer of propylene with a weight average molecular weight of at least 200,000 or 200,000-350,000, and low molecular component comprising a (co- or homo)polymer of propylene with a weight average molecular weight of less than 100,00 or 50,000-100,000. The weight ratio between the high molecular weight component and the low molecular weight component in the polymeric thickener can be between 1:40 and 3:1; between 1:40 and 1:1; between 1:40 and 1:5; between 1:25 and 1:15; or between 1:18 and 1:20.

In a further embodiment, the low molecular weight component comprises a polypropylene copolymer or a polypropylene homopolymer with a melt flow rate of 500-1500 dg/min., or 750-1250 dg/min. as determined by test ASTM D-1238. In another embodiment, the high molecular weight component has a melt flow rate (ASTM D-1238) of 1.5-15; 1.5-7; or 3-5 dg/min. In a further or alternative embodiment, the high molecular weight component comprises a polypropylene homopolymer or a propylene/ethylene-copolymer.

In another embodiment, the composition comprises 5-10%; 10-20%; or 8-15% by weight of an active ingredient. In another embodiment, the composition comprises 10-20%; 20-40%; 40-60%; 15-30%; 20-60%; or 30-60% by weight of the first aqueous phase comprising at least one non-deliquescent salt. In another embodiment, the composition comprises 10-20%; 20-40%; 40-60%; 15-30%; 20-60%; or 30-60% by weight of an oil phase comprising an oil medium. In another embodiment, the composition comprises 0.1-2%; 2-5%; 5-10%; 10-20%; or 7-15% by weight of a lipophilic emulsifier or hydrophobic emulsifier. In another embodiment, the composition comprises 0.1-2%; 2-5%; 1-3%; or 1.5-4% by weight of an oil soluble thickener or a hydrophilic emulsifier.

In certain embodiments, the aqueous-in-oil emulsion composition comprises a lipophilic emulsifier. In some embodiments, the lipophilic emulsifier is selected from the group consisting of polyglycerol polyricinoleate, lecithin, sorbitan fatty esters, and combinations thereof. In one embodiment, the lipophilic emulsifier is polyglycerol polyricinoleate (PGPR).

In certain embodiments, the aqueous-in-oil emulsion composition comprises an oil soluble thickener. In some embodiments, the oil soluble thickener is selected from the group consisting of natural rubber, polypropylene, polyisoprene, polybutadiene, poly(styrene-butadiene), poly(ethylene-propylene-diene), polyurethane, polymethacrylate, polyisobutylene, poly(isobutylene-succinic acid), poly(isobutylene-succinic acid-polyacrylamide), polyurea, polyethylene, and combinations thereof. In one embodiment, the oil soluble thickener is a (co- or homo)polymer of propylene.

In certain aspects, the second aqueous phase comprises water. In some embodiments, water is present at a ratio of aqueous-in-oil emulsion composition:water from 1:1 to 1:100.

In some aspects, the hydrophilic emulsifier is present in the second aqueous phase. In some embodiments, the hydrophilic emulsifier is selected from the group consisting of cellulosics (e.g., hydroxyethyl cellulose), gums (e.g., guar, xanthan), polysaccharides (e.g., carragenaan), clays (e.g., bentonite, and other montmorillonite clays), and combinations thereof. In one embodiment, the hydrophilic emulsifier is hydroxyethyl cellulose.

In some aspects, the surfactant is present in the second aqueous phase. In some embodiments, the surfactant is a non-ionic surfactant. In some embodiments, the surfactant is selected from the group consisting of poly(vinyl alcohol), poly(acrylic acid), poly(acrylamide), sodium caseinate, whey protein isolate (WPI), polysaccharide, copolymers of ethylene glycol and propylene glycol (e.g. Pluronic), polyoxyethylene derivatives of sorbitan monolaureate (e.g. polysorbate 20, polysorbate 80) and combinations thereof.

In some embodiments, the surfactant has a hydrophilic/lipophilic balance (HLB) of between 10-15. In other embodiments, the surfactant has an HLB of about 12. In yet other embodiments, the surfactant has an HLB of about 12.3. In some embodiments, the surfactant has an HLB of about 13. In other embodiments, the surfactant has an HLB of about 13.8. In yet other embodiments, the surfactant has an HLB of about 14. In some embodiments, the surfactant has an HLB of about 14.4. the surfactant has an HLB of about 15.

In certain aspects, the surfactant is an aqueous salt solution of a styrene-maleic anhydride copolymer. In other aspects, the surfactant is an aqueous salt solution of a partial ester of a styrene-maleic anhydride copolymer.

In a further embodiment, the surfactant is selected from the group consisting of fatty ethoxylates, fatty acid esters of polyhydroxy compounds, amide oxides, alkyl oxide block copolymers, silicone based nonionic surfactants, fluorosurfactants, and combinations thereof.

In some embodiments, one or more cationic surfactant is used. Suitable cationic surfactants include, for example, amine surfactants and quaternary ammonium salt surfactants. In some embodiments, no cationic surfactant is used.

In some embodiments, one or more nonionic surfactant is used. Among embodiments in which one or more nonionic surfactant is used, some suitable nonionic surfactants include, for example, fatty ethoxylates, fatty acid esters of polyhydroxy compounds, amide oxides, alkyl oxide block copolymers, silicone based nonionic surfactants, fluorosurfactants, and mixtures thereof.

Suitable fatty ethoxylates include, for example, ethoxylates of fatty alcohols, ethoxylates of fatty acids, ethoxylates of fatty ethanolamides, and ethoxylates of fatty amines. Suitable ethoxylates of fatty alcohols include, for example, ethoxylates of fatty alcohols that have any combination of the following characteristics: linear or branched; primary or secondary; alkyl or alkyl aryl. In some embodiments, one or more fatty ethoxylate is used that is an aryl alkyl ethoxylate, a fatty alcohol ethoxylate, or a mixture thereof.

Suitable silicone based nonionic surfactants include, for example, those with the formula

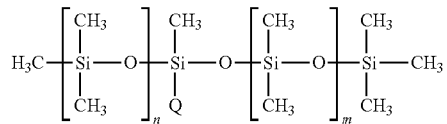

where n is 1 to 5, m is 0 to 4, and Q is

where p is 1 to 6, and q is 3 to 20. In some embodiments, n is 1. Independently, in some embodiments, m is zero. Independently, in some embodiments, p is 3. Independently, in some embodiments, q is 7 or 8 or a mixture thereof. One further example of a suitable nonionic surfactant is Atplus 595. Mixtures of suitable surfactants are also suitable In various embodiments, by weight percentage (%) recited herein does not consider the second aqueous phase.

In some embodiments, no composition of the present invention includes one or more metal-complexing agents.

In some embodiments, one or more compositions of the present invention includes one or more metal-complexing agents. A metal-complexing agent is a compound that is capable of forming coordinate bonds with metal atoms. Some metal-complexing agents are chelating agents. As used herein, a "chelating agent" is a compound, each molecule of which is capable of forming two or more coordinate bonds with a single metal atom. Some metal-complexing agents form coordinate bonds with metal atoms because the metal-complexing agents contain electron-donor atoms that participate in coordinate bonds with metal atoms. Suitable chelating agents include, for example, organic and inorganic chelating agents. Among the suitable inorganic chelating agents are, for example, phosphorous-containing chelating agents such as, for example, tetrasodium pyrophosphate, sodium tripolyphosphate, and hexametaphosphoric acid. Among the suitable organic chelating agents are those with macrocyclic structures and non-macrocyclic structures. Among the suitable macrocyclic organic chelating agents are, for example, porphine compounds, cyclic polyethers (also called crown ethers), and macrocyclic compounds with both nitrogen and oxygen atoms.

Some suitable organic chelating agents that have non-macrocyclic structures are, for example, aminocarboxylic acids, 1,3-diketones, hydroxycarboxylic acids, polyamines, aminoalcohols, aromatic heterocyclic bases, phenol, aminophenols, oximes, Shiff bases, sulfur compounds, and mixtures thereof. In some embodiments, the chelating agent includes one or more aminocarboxylic acids, one or more hydroxycarboxylic acids, one or more oximes, or a mixture thereof. Some suitable aminocarboxylic acids include, for example, ethylenediaminetetraacetic acid (EDTA), hydroxyethylethylenediaminetriacetic acid (HEDTA), nitrilotriacetic acid (NTA), N-dihydroxyethylglycine (2-HxG), ethylenebis (hydroxyphenylglycine) (EHPG), and mixtures thereof. Some suitable hydroxycarboxylic acids include, for example, tartaric acid, citric acid, gluconic acid, 5-sulfosalicylic acid, and mixtures thereof. Some suitable oximes include, for example, dimethylglyoxime, salicylaldoxime, and mixtures thereof. In some embodiments, EDTA is used.

Some additional suitable chelating agents are polymeric. Some suitable polymeric chelating agents include, for example, polyethyleneimines, polymethacryloylacetones, poly(acrylic acid), and poly(methacrylic acid). Poly(acrylic acid) is used in some embodiments.

Some suitable metal-complexing agents that are not chelating agents are, for example, alkaline carbonates, such as, for example, sodium carbonate.

Metal-complexing agents may be present in neutral form or in the form of one or more salts. Mixtures of suitable metal-complexing agents are also suitable.

In some embodiments, the amount of metal-complexing agent is, based on the total weight of the water, 25% by weight or less; or 10% by weight or less; or 1% by weight or less. Independently, in some embodiments, the amount of metal-complexing agent is, based on the total weight of the water, 0.00001% or more; or 0.0001% or more; or 0.01% or more.

Independently, in some embodiments, the molar concentration of metal-complexing agent in the water (i.e., moles of metal-complexing agent per liter of water) is 0.00001 mM (i.e., milli-molar) or greater; or 0.0001 mM or greater; or 0.001 mM or greater; or 0.01 mM or greater; or 0.1 mM or greater. Independently, in some embodiments, the concentration of metal-complexing agent is 100 mM or less; or 10 mM or less; or 1 mM or less.

In some embodiments, the ratio of the weight of metal complexing agent to the weight of cyclopropene molecular encapsulating agent complex is 0.001 or greater; or 0.003 or greater; or 0.01 or greater; or 0.03 or greater; or 0.1 or greater. Independently, in some embodiments, the ratio of the weight of metal complexing agent to the weight of cyclopropene molecular encapsulating agent complex is 1000 or lower; or 300 or lower; or 100 or lower; or 30 or lower; or 10 or lower.

In some embodiments of the present invention, one or more adjuvants are also included in the composition of the present invention. The use of adjuvants is considered optional in the practice of the present invention. Adjuvants may be used alone or in any combination. When more than one adjuvant is used, it is contemplated that any combination of one or more adjuvants may be used. Some suitable adjuvants are surfactants, alcohols, oils, extenders, pigments, fillers, binders, plasticizers, lubricants, wetting agents, spreading agents, dispersing agents, stickers, adhesives, defoamers, thickeners, transport agents, and emulsifying agents.

In some embodiments, a composition of the present invention is used that contains at least one adjuvant selected from alcohols, oils, and mixtures thereof; such a composition may or may not additionally contain one or more surfactant.

In some embodiments, a composition of the present invention may be stored for later use. Compositions of the present invention may be stored in any form. In some embodiments, the composition of the present invention may be stored in a sealed container. A sealed container is one that is constructed so that no effective amount of material (solid, liquid, or gas) passes in or out of the container. Independent of the type of container used, compositions of the present invention may be stored for 3 hours or longer; or 8 hours or longer; or 1 day or longer; or 1 week or longer; or 3 weeks or longer; or 2 months or longer; or 6 months or longer.

In the practice of the present invention, one or more oils are used. As used herein, an "oil" is a compound that is liquid at 25° C. and 1 atmosphere pressure and that has a boiling point at 1 atmosphere pressure of 30° C. or higher. As used herein, "oil" optionally does not include water, optionally does not include surfactants (as described herein), and optionally does not include dispersants (as described herein).

In some embodiments, one or more oil may be used that has boiling point of 50° C. or higher; or 75° C. or higher; or 100° C. or higher. In some embodiments, the oil used has boiling point of 50° C. or higher. In some embodiments, the oil used has boiling point of 75° C. or higher. In some embodiments, the oil used has boiling point of 100° C. or higher. Independently, in some of the embodiments that use oil, one or more oil may be used that has an average molecular weight of 100 or higher; or 200 or higher; or 500 or higher. In some embodiments, the oil used has an average molecular weight of 100 or higher. In some embodiments, the oil used has an average molecular weight of 200 or higher. In some embodiments, the oil used has an average molecular weight of 500 or higher.

An oil may be either a hydrocarbon oil (i.e., an oil whose molecule contains only atoms of carbon and hydrogen) or a non-hydrocarbon oil (i.e., an oil whose molecule contains at least at least one atom that is neither carbon nor hydrogen).

Some suitable hydrocarbon oils are, for example, straight, branched, or cyclic alkane compounds with 6 or more carbon atoms. Some other suitable hydrocarbon oils, for example, have one or more carbon-carbon double bond, one or more carbon-carbon triple bond, or one or more aromatic ring, possibly in combination with each other and/or in combination with one or more alkane group. Some suitable hydrocarbon oils are obtained from petroleum distillation and contain a mixture of compounds, along with, in some cases, impurities. Hydrocarbon oils obtained from petroleum distillation may contain a relatively wide mixture of compositions or may contain relatively pure compositions. In some embodiments, hydrocarbon oils are used that contain 6 or more carbon atoms. In some embodiments, hydrocarbon oils are used that contain 18 or fewer carbon atoms. In some embodiments, every hydrocarbon oil that is used contains 18 or fewer carbon atoms. In some embodiments, every hydrocarbon oil that is used contains 6 or more carbon atoms. Some suitable hydrocarbon oils include, for example, hexane, decane, dodecane, hexadecane, diesel oil, hydrotreated light petroleum distillates, hydrotreated medium petroleum distillates, refined paraffinic oil (e.g., Ultrafine™ spray oil from Sun Company), and mixtures thereof. In some embodiments, the oil used is a hydrocarbon oil.

Among embodiments that use non-hydrocarbon oil, some suitable non-hydrocarbon oils are, for example, fatty non-hydrocarbon oils. "Fatty" means herein any compound that contains one or more residues of fatty acid. Fatty acids are long-chain carboxylic acids, with chain length of at least 4 carbon atoms. Typical fatty acids have chain length of 4 to 18 carbon atoms, though some have longer chains. Linear, branched, or cyclic aliphatic groups may be attached to the long chain. Fatty acid residues may be saturated or unsaturated, and they may contain functional groups, including for example alkyl groups, epoxide groups, halogens, sulfonate groups, or hydroxyl groups, which are either naturally occurring or that have been added. Some suitable fatty non-hydrocarbon oils are, for example, fatty acids; esters of fatty acids; amides of fatty acids; dimers, trimers, oligomers, or polymers thereof; and mixtures thereof.

Some of the suitable fatty non-hydrocarbon oils are, for example, esters of fatty acids. Such esters include, for example, glycerides of fatty acids. Glycerides are esters of fatty acids with glycerol, and they may be mono-, di-, or triglycerides. A variety of triglycerides are found in nature. Most of the naturally occurring triglycerides contain residues of fatty acids of several different lengths and/or compositions. Some suitable triglycerides are found in animal sources such as, for example, dairy products, animal fats, or fish. Further examples of suitable triglycerides are oils found in plants, such as, for example, coconut, palm, cottonseed, olive, tall, peanut, safflower, sunflower, corn, soybean, linseed, tung, castor, canola, citrus seed, cocoa, oat, palm, palm kernel, rice bran, cuphea, or rapeseed oil.

Among the suitable triglycerides, independent of where they are found, are those, for example, that contain at least one fatty acid residue that has 14 or more carbon atoms. Some suitable triglycerides have fatty acid residues that contain 50% or more by weight, based on the weight of the residues, fatty acid residues with 14 or more carbon atoms, or 16 or more carbon atoms, or 18 or more carbon atoms. One example of a suitable triglyceride is soybean oil.

Suitable fatty non-hydrocarbon oils may be synthetic or natural or modifications of natural oils or a combination or mixture thereof. Among suitable modifications of natural oils are, for example, alkylation, hydrogenation, hydroxylation, alkyl hydroxylation, alcoholysis, hydrolysis, epoxidation, halogenation, sulfonation, oxidation, polymerization, and combinations thereof. In some embodiments, alkylated (including, for example, methylated and ethylated) oils are used. One suitable modified natural oil is methylated soybean oil.

Also among the suitable fatty non-hydrocarbon oils are self-emulsifying esters of fatty acids.

Another group of suitable non-hydrocarbon oils is the group of silicone oils. Silicone oil is an oligomer or polymer that has a backbone that is partially or fully made up of —Si—O— links. Silicone oils include, for example, polydimethylsiloxane oils. Polydimethylsiloxane oils are oligomers or polymers that contain units of the form

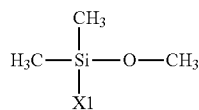

where at least one of the units has X1=CH$_3$. In other units, X1 may be any other group capable of attaching to Si, including, for example, hydrogen, hydroxyl, alkyl, alkoxy, hydroxyalkyl, hydroxyalkoxy, alkylpolyalkoxyl, substituted versions thereof, or combinations thereof. Substituents may include, for example, hydroxyl, alkoxyl, polyethoxyl, ether linkages, ester linkages, amide linkages, other substituents, or any combination thereof. In some embodiments, the oil used is a silicone oil.

In some suitable polydimethylsiloxane oils, all X1 groups are groups that are not hydrophilic. In some suitable polydimethylsiloxane oils, all X1 groups are alkyl groups. In some suitable polydimethylsiloxane oils, all X1 groups are methyl. In some embodiments, every silicone oil is a polydimethylsiloxane oil in which all X1 groups are methyl. In some suitable polydimethylsiloxanes, at least one unit has an X1 group that is not methyl; if more than one non-methyl X1 unit is present, the non-methyl X1 units may be the same as each other, or two or more different non-methyl X1 units may be present. Polydimethylsiloxane oils may be end-capped with any of a wide variety of chemical groups, including, for example, hydrogen, methyl, other alkyl, or any combination thereof. Also contemplated are cyclic polydimethylsiloxane oils. Mixtures of suitable oils are also suitable.

In certain aspects, the aqueous-in-oil-in-aqueous double emulsion composition described herein is formulated as a sprayable formulation. In some embodiments, the formulation is diluted with a solvent. In certain embodiments, the solvent comprises water. In certain embodiments, the solvent comprises sodium caseinate (NaCSn), lactose, or a combination thereof. In certain aspects, a method for co-injecting the aqueous-in-oil emulsion with water is applicable, wherein the ratio of emulsion to water is from 1:1 to 1:100.

In another aspect, a method for preparing an aqueous-in-oil-in-aqueous double emulsion composition is provided. The method comprises (a) preparing an aqueous-in-oil emulsion composition using an aqueous phase, an oil phase, a lipophilic emulsifier, and an oil soluble thickener; (b) combining an active ingredient into the aqueous-in-oil emulsion composition; and (c) dispersing the aqueous-in-oil emulsion composition into a second aqueous phase. The previously described embodiments of the aqueous-in-oil-in-aqueous double emulsion composition are applicable to the method for preparing an aqueous-in-oil-in-aqueous double emulsion composition described herein.

In various embodiments, the method further comprises addition of a hydrophilic emulsifier to the second aqueous phase. In some embodiments, the method further comprises addition of a surfactant to the second aqueous phase.

In one aspect, a method of treating plants or plant parts is provided. The method of treating plants or plant parts comprises the step of contacting the plant or plant parts with an aqueous-in-oil-in-aqueous double emulsion as described herein. The previously described embodiments of the aqueous-in-oil-in-aqueous double emulsion composition and of the method for preparing an aqueous-in-oil-in-aqueous double emulsion composition are applicable to the method of treating plants or plant parts described herein. In another aspect, provided is a method of inhibiting an ethylene response in plants or plant parts, comprising applying to the plants or plant parts an effective amount of the double emulsion composition disclosed herein or the diluted formulation from such double emulsion composition.

In another embodiment, other agrochemical active ingredients can be added to the water diluted water-in-oil emulsion of the present invention. Examples of agrochemical active ingredients suitable for use within the diluted water-in-oil emulsion include, those disclosed in U.S. Pat. No. 8,946,122, the content of which is incorporated by reference in its entirety.

Among embodiments in which plants are treated using methods involving a composition of the present invention, the plants that are treated may be any plants that produce a useful product. Among embodiments in which plant parts are treated using methods involving a composition of the present invention, the plant parts that are treated may be any part of the plant that produces a useful product. In some embodiments, useful plant parts are treated with a method involving use of a composition of the present invention.

As used herein, to "treat" a plant or plant part means to bring the plant or plant part into contact with a material.

In embodiments of the present invention in which a plant or plant part is treated, a composition of the present invention is used in a way that brings cyclopropene into contact with the plant or plant part. In some embodiments, the method involves using a composition of the present invention in a way that releases cyclopropene from the cyclopropene molecular encapsulating agent complex under conditions in which the cyclopropene then comes into contact with the plant or plant part.

For example, an embodiment of the composition of the present invention may be used in a process that brings cyclopropene into contact with plants or plant parts. Such contact may be performed in any of a wide variety of ways. For example, a embodiment of the composition of the present invention is placed in a closed space (such as, for example, a transportation trailer or a controlled-atmosphere room) along with plants or plant parts, and operations are performed on the composition to promote the release of cyclopropene from the composition into the atmosphere of the closed space. Operations that promote the release of cyclopropene from the composition include, for example, introducing gas bubbles into the composition.

For another example, an embodiment of the composition of the present invention may be placed in a closed space along with plants or plant parts, operations may be performed on the composition to promote the release of cyclopropene from the composition into the atmosphere of the closed space. Operations that promote the release of cyclopropene from the composition include, for example, contacting the composition of the present invention with water or with a high-humidity atmosphere.

In some embodiments, the practice of the present invention involves bringing the cyclopropene molecular encapsulating agent complex into contact with the plant or plant part. While the present invention is not limited to any particular theory or mechanism, it is contemplated that, in embodiments in which a cyclopropene molecular encapsulating agent complex is brought into contact with a plant or plant part, some or all of the cyclopropene subsequently departs from the molecular encapsulating agent and, possibly after a diffusion process, comes into direct contact with the plant or plant part.

For example, an embodiment of the composition of the present invention may be brought into contact with plants or plant parts directly. Some examples of methods of such contact are, for example, spraying, foaming, fogging, pouring, brushing, dipping, similar methods, and combinations thereof. In some embodiments, spraying or dipping or both is used. In some embodiments, spraying is used. Such contact may be performed indoors or outdoors. In some of such embodiments, contact is performed on all or part of a plant while it is growing in a field (i.e., outdoor applications). It is contemplated that the compositions provided can be mixed with water in a spray tank for indoor and/or outdoor (open field) applications.

Normally, a specific part of the plant forms the useful product. A plurality of useful plant parts, after removal from a plurality of plants, is known as a "crop." Some types of plants have a single type of useful plant part, while other types of plants have plural types of useful plant parts.

Among the plants and plant parts that are suitable for use in the present invention, are, for example, plants (and parts thereof) with plant parts that are edible, plants (and parts thereof) with plant parts that are non-edible but useful for some other purpose, and combinations thereof. Also contemplated as suitable plants (and parts thereof) are those from which useful materials can be extracted; such useful materials may be, for example, edible materials, raw materials for manufacturing, medicinally useful materials, and materials useful for other purposes.

Further contemplated as suitable plants (and parts thereof) are those that yield plant parts that are useful for their beauty and/or ornamental properties. Such ornamental plant parts include, for example, flowers and other ornamental plant parts such as, for example, ornamental leaves. Some of such plants produce useful bulbs. In some embodiments, an entire ornamental plant is considered to be the useful plant part.

Plants that produce all types of edible plant parts are contemplated as suitable for use in the present invention. Also suitable are all types of edible plant parts.

Many of the plants (and parts thereof) that are suitable for use in the practice of the present invention can be usefully divided into categories or groups. One useful method for defining such groups is the "Definition and Classification of Commodities," published on or before Mar. 23, 2006, by the Food and Agriculture Organization ("FAO") of the United Nations as a "Draft." In the practice of some embodiments of the present invention, it is contemplated to treat plants that produce one or more crops that fall within any of the crop groups defined by the FAO. In some embodiments, it is contemplated to treat one or more crops that fall within one or more of those groups.

In a further aspect, provided is an aqueous-in-oil emulsion composition. The composition comprises:
(a) 20-80% by weight of an aqueous phase containing salt (APCS). The APCS comprises of water (10-50%), salt (10-60%), and a cyclodextrin complex (5-20%). The complex is made up of cyclodextrin and a water sensitive agrochemically active ingredient (e.g., 1-MCP). The complex can be made up of cyclodextrin and a water sensitive pharmaceutically active ingredient or cyclodextrin and a water sensitive food active ingredient;
(b) 20-80% by weight of an oil phase comprising an oil medium;
(c) 0.05-20.0% by weight of a lipophilic emulsifier; and
(d) 0-5% by weight of an oil soluble thickener.

The previously described embodiments of the aqueous-in-oil-in-aqueous double emulsion composition are applicable to the aqueous-in-oil emulsion composition described herein.

In another further aspect, provided is a second aqueous-in-oil-in-aqueous double emulsion composition. The composition comprises:
(a) 5-20% by weight of an active ingredient;
(b) 10-80% by weight of a first aqueous phase comprising at least one non-deliquescent salt, wherein the ratio of dry weight of the salt to weight of the first aqueous phase is at least 0.2;
(e) 10-80% by weight of an oil phase comprising an oil medium;
(f) 0.05-20% by weight of a lipophilic emulsifier or hydrophobic emulsifier;
(g) 0-5% by weight of an oil soluble thickener or a hydrophilic emulsifier; and
(h) a second aqueous phase;
wherein the by weight % does not consider the second aqueous phase.

The previously described embodiments of the first aqueous-in-oil-in-aqueous double emulsion composition are applicable to second aqueous-in-oil-in-aqueous double emulsion described herein.

Those skilled in the art would understand certain variations can exist based on the disclosure provided. Thus, the following examples are given for the purpose of illustrating the invention and shall not be construed as being a limitation on the scope of the invention or claims.

EXAMPLES

Determining the 1-MCP concentration in a formulation: Approximately 120 milligrams of formulation is accurately weighed into a 120 mL serum bottle using a disposable pipette. 3 mL of Milli Q water is added add to the bottle. The bottle is capped with a crimp cap or Mininert valve. Using a gas tight syringe 0.25 mL of pure cis-2-butene is added to the 0.25 mL to the bottle containing the sample. The bottle is placed on a multi-purpose rotator and the contents shaken for 30 minutes. A sample of the headspace is analyzed by GC for 1-MCP concentration. This value is then used to calculate the amount of 1-MCP in the original formulation.

Determining the 1-MCP concentration in the headspace: Ten 100 mL Wheaton brand serum bottles are filled with water and the volume measured. The average volume of the ten bottles is 120 ml. 60 mL (which is 50% full) or 108 mL (which is 90% full) of the formulation is introduced into the bottle with the formulation being tested. A funnel is used to prevent the formulation from sticking to the neck of the bottle. The bottle is sealed with a Mininert stopper that has a needle valve for sampling. The bottle is placed on a multi-purpose rotator to agitate the throughout the experiment. A sample of the headspace is analyzed for 1-MCP using isobutylene as an external standard.

Example 1

To prepare a stable W/O/W double emulsion, a stable water-in-oil (W/O) primary emulsion utilizing an effective hydrophobic (oil soluble) emulsifier is prepared first. Polyglycerol polyricinoleate (PGPR), a food grade additive, can be effective in emulsifying aqueous solutions containing salt, for example magnesium chloride ($MgCl_2$) solutions in soybean oil. These stable W/O emulsions can then be dispersed in water, using sodium caseinate as the hydrophilic emulsifier, to provide stable W/O/W double emulsions. Thus, using the W/O/W double emulsion approach it may be possible to make a stable W/O emulsion of HAIP in soybean oil (product concentrate) which could be further dispersed in water (W/O/W) to make a relatively stable double emulsion (low headspace for ~3 hours). Such double emulsion or formulation diluted with water can then be spray applied to fruit trees and other row crops.

The HAIP dispersion in water with magnesium sulfate ($MgSO_4$) is prepared and designated as the aqueous phase containing salt (APCS; for example see U.S. Pat. No. 8,691,728, the content of which is incorporated by reference). Exemplary preparations may contain 15-35% HAIP with 30-70% $MgSO_4 \cdot 7H_2O$. W/O emulsions of APCS in soybean oil containing PGPR (Paalsgaard PGPR4125 as the hydrophobic emulsifier) is prepared and designated as the primary emulsion 1 (PE1). 8 g of PGPR is added to 92 g of soybean oil at 50° C. with stirring, and the PE1 solution is stirred for 1 hour (BMS-7636). Next different amounts of APCS are added to the PE1 to prepare different samples. The samples are then homogenized for 2 minutes.

TABLE 1

Water-in-oil emulsion with aqueous phase containing salt (APCS)

| Sample ID | APCS (%) | BMS-7636 (%) | AI (%) | AI remaining (7 days/ 54 C.) | Comments |
|---|---|---|---|---|---|
| BMS-7637-80 | 80 | 20 | — | — | Very thick like cream cheese; Does not flow |
| BMS-7637-70 | 70 | 30 | 0.74 | 73% | Viscous |
| BMS-7637-60 | 60 | 40 | 0.62 | 93% | Viscous |
| BMS-7637-50 | 50 | 50 | 0.46 | 120% | Thick flowing liquid; No settling |
| BMS-7637-20 | 20 | 80 | 0.24 | 81% | Free flowing liquid; Slight settling |

Table 1 shows that emulsions of APCS in soybean oil can provide free flowing liquids when the APCS content is ≤50% by weight. PGPR appears an effective emulsifier in the oil. The emulsions are physically stable (very slight settling) and are chemically stable losing <20% AI when stored at 54° C. for 1 week. This indicates that these formulations can be stable for >12 months at ambient storage.

The amount of PGPR that would be needed to make stable emulsions is also investigated. 1, 4, and 8% PGPR in the soybean oil are tested with 20 and 50% APCS in the emulsions, where the previous samples with 50% APCS are very thick and the previous samples with 20% APCS are much less viscous. Although physically stable emulsions can be obtained with only 1% PGPR, it seems that slightly higher loading (4%) of PGPR (WJZ6522-4 and WJZ6525-4) provides better chemical stability.

TABLE 2

W/O emulsions with aqueous phase containing salt (APCS) containing different amounts of PGPR in the soybean oil

| Sample ID | APCS: oil | % PGPR in oil | 1-MCP (ppm) in headspace (24 h) | % 1-MCP Day 0 | % 1-MCP 7 days at 54° C. | % AI remaining |
|---|---|---|---|---|---|---|
| WJZ6522-1 | 50:50 | 1 | 6721 | 0.60 | 0.43 | 71.1 |
| WJZ6522-4 | | 4 | 5780 | 0.60 | 0.50 | 84.0 |
| WJZ6522-8 | | 8 | 5961 | 0.60 | 0.51 | 84.0 |
| WJZ6525-1 | 20:80 | 1 | 2889 | 0.21 | 0.17 | 73.9 |
| WJZ6525-4 | | 4 | 2905 | 0.22 | 0.18 | 78.3 |
| WJZ6525-8 | | 8 | 3526 | 0.22 | 0.18 | 78.3 |

A modified aqueous phase containing salt (MAPCS) is also prepared by using low amounts of polyvinyl alcohol (PVOH). One useful example of the MAPCS has 24% HAIP, 16.1% $MgSO_4$, and 1% PVOH (all by weight). W/O emulsions are prepared using this MAPCS (Lot # BMS7643) as shown in Table 3.

TABLE 3

W/O emulsions with modified aqueous phase containing salt (MAPCS) in soybean oil

| Sample ID | MAPCS: oil | % PGPR in oil | 1-MCP (ppm) in headspace (24 h) | % 1-MCP Day 0 | % 1-MCP 7 day at 54° C. | % AI remaining |
|---|---|---|---|---|---|---|
| BMS7643-1 | 20:80 | 8 | 4585 | 0.17 | 0.02 | 11.8 |
| BMS7643-2 | 50:50 | 8 | 6180 | 0.37 | 0.13 | 35.1 |

The extensive degradation of 1-MCP upon high temperature storage indicates that the droplets of MAPCS in the soybean oil are porous and 1-MCP escapes into the oil phase where it degrades. This may be due to the presence of the PVOH, which can behave as a hydrophilic surfactant and destabilize the water-oil interface. Since this process will accelerate at higher temperatures, the storage stability tests are repeated at a more conventional temperature of 40° C. with lower amounts of PGPR.

Although there is more AI retention at 40° C. compared to 54° C., there will likely be still significant loss for these formulations to be commercially viable.

TABLE 4

W/O emulsions with modified aqueous phase containing salt (MAPCS) in soybean oil with lower amounts of PGPR

| Sample ID | MAPCS: oil | % PGPR in oil | % 1-MCP Day 0 | % 1-MCP 7 days at 40° C. | % 1-MCP 4 weeks at 40° C. | % AI remaining |
|---|---|---|---|---|---|---|
| BMS7650-4 | 20:80 | 4 | 0.16 | 0.10 | 0.07 | 43.8 |
| BMS7650-2 | | 2 | 0.16 | 0.10 | 0.06 | 37.8 |
| BMS7650-1 | | 1 | 0.16 | 0.10 | 0.06 | 37.8 |
| BMS7651-4 | 50:50 | 4 | 0.40 | 0.27 | 0.22 | 55.0 |
| BMS7651-2 | | 2 | 0.38 | 0.25 | 0.21 | 55.3 |
| BMS7651-1 | | 1 | 0.34 | 0.24 | 0.20 | 58.8 |

W/O/W double emulsions for spraying can be prepared as follows. For applying a formulation, on row crops using commercial sprayers, the AI concentration in the spray tank needs to be ≤1 g AI/L, or 0.1%. These low AI concentrations can be obtained by further dilutions of the W/O emulsion. Sodium caseinate (NaCSn) and lactose can be added during W/O/W double emulsion preparation to provide the minimum mixing between the internal and external aqueous phases. Dilutions are made by adding the emulsion concentrates to water (containing different additives) with stirring, and results are shown in Table 5.

TABLE 5

Dilution of W/O emulsions containing HAIP

| Sample ID | Composition of aqueous phase | Emulsion concentrate | Ratio of emulsion to water | AI (%) | 1-MCP in headspace (ppm) 1 hour | 1-MCP in headspace (ppm) 3 hours |
|---|---|---|---|---|---|---|
| WJZ6527B | 12% NaCSn + 1% lactose | WJZ6527SM | 1:4 | 0.11 | 9460 | 12,259 |
| WJZ6527D | 12% NaCSn + 1% lactose | WJZ6527SM | 1:7 | 0.06 | 5073 | 7722 |
| WJZ6534A | 12% NaCSn + 1% lactose | WJZ6534SM | 1:3 | 0.05 | 7,194 | 8,344 |
| WJZ6534B | 12% NaCSn + 1% lactose | WJZ6534SM | 1:1 | 0.07 | 4,944 | 5,833 |

The W/O emulsions used for the dilution experiments are:
WJZ6527SM=50:50 APCS/soybean oil containing 4% PGPR (0.60% AI)
WJZ6534SM=20:80 APCS/soybean oil containing 4% PGPR (0.21% AI).

Table 5 shows that the 1:7 dilution of the 50:50 W/O emulsion (WJZ6527SM) provides a sprayable solution with 0.06% AI and low concentrations of 1-MCP in the headspace. The 20:80 W/O emulsion (WJZ6534SM) when added to water (containing 12% NaCSn and 1% lactose) provides very viscous materials (WJZ 6534A and WJZ 6534B).

By using a water-in-oil emulsion approach, it is possible to formulate stable dispersions of HAIP in oil that are chemically and physically stable and have low AI content (0.2%). These emulsions can be sprayed directly or further diluted in water to create formulations that have very low AI (0.05%) and low headspace concentration of 1-MCP.

Example 2

Additional water-in-oil (W/O) emulsions are prepared where the aqueous phase is APCS and the oil phase comprises a vegetable oil (for example soybean oil) or paraffin oils (for example Conosol 260 and/or Isopar V). Polyglycerol polyricinoleate (PGPR) is used as the hydrophobic emulsifier. The W/O emulsions can be diluted in water to provide formulations containing low (for example <0.1%) active ingredient (AI). These formulations can then be sprayed using standard sprayers typically used in farms and orchards.

4 g of PGPR is added to 96 g of oil (heated to 50° C. for soybean oil) with stirring (the primary emulsion 2 (PE2)), and the PE2 solution is stirred for 1 hour. The primary emulsion 3 (PE3) is prepared similarly using Conosol 260, and the primary emulsion 4 (PE4) is prepared similarly using Isopar V. An equal weight of the APCS is slowly added to the PE2, PE3, and PE4, respectively. After all the APCS is added the dispersion is homogenized with an IKA (set at #2.5) for 3 minutes. The AI concentration in these emulsions is ~0.6% by weight. The headspace concentration is determined for all the three formulations.

A combination of whey protein isolate (WPI) and hydroxyethyl cellulose (HEC, Cellosize QP 100MH) as polysaccharides is used as the hydrophilic emulsifier in the water to generate stable W/O/W emulsions. A series of 1:32 dilutions is prepared for different primary emulsions. The WPI and HEC are first combined with the water and then the primary emulsion is added with mechanical stirring. The AI concentration in these dilutions is ~0.02% by weight.

An additional W/O/W double emulsion is prepared by adding 250 g of APCS to 250 g of Isopar V containing 4% PGPR. This mixture is then homogenized using an IKA (set at #2.5-3) for 20 minutes. The solvent (aqueous phase) used for dilution is prepared by adding Cellosize QP100MH (HEC) to well stirred Milli q water at 40° C. Stirring is continued for 40 minutes to dissolve the HEC. The stabilities of various dilution preparations are recorded. If formation of two layers is observed, the dilution is recorded as an unstable dispersion. The samples are then analyzed for AI content in triplicate. For headspace measurement, a 60 g aliquot is weighed in a 122 mL bottle. A headspace sample is taken after 1 hour, 3 hours and 5 hours, and analyzed for 1-MCP.

TABLE 6

| Aqueous phase containing salt (APCS) emulsified in different oils with PGPR | | | | | |
|---|---|---|---|---|---|
| Sample ID | Oil | Viscosity (mPa · s) | 1-MPC in headspace | AI retention (10 days/ 54° C.) | Physical stability |
| BMS7666-B | Soybean | 39 | 7268 ppm (5 h) | 85% | Slight settling, easily dispersed |
| BMS7663-4 | Conosol 260 | 5 | 18,088 ppm (3 h) | <1% | Hard pack within a few days |
| BMS7667-2 | Isopar V | 13 | 2905 ppm (5 h) | 87% | No settling |

Table 6 shows that using Isopar V as the oil phase (BMS7667-2) provides a stable emulsion with the lowest concentration of 1-MCP in the headspace. On the other hand using Conosol 260 as the oil phase (BMS7663-4) provides an unstable emulsion which formed a hard pack after a few days. In addition the concentration of 1-MCP in the headspace is >18,000 ppm, which is not acceptable. The formulation using soybean oil (BMS7666-B) gives a relatively stable emulsion (some settling on storage) and low headspace concentration of 1-MCP. Since the soybean oil is viscous, the formulation is thick. The emulsions with soybean oil and Isopar V demonstrated high chemical stability with >85% AI remaining after storage at 54° C. for 10 days. The emulsion made with Conosol 260 loses all of the AI under the same conditions.

Table 7 shows that chemically and physically stable dilutions can be generated using water containing a mixture of the hydrophilic surfactant WPI and HEC. Dilutions of the emulsion containing Conosol 260 generate formulations (BMS-7665-1, BMS-7665-2, and BMS-7665-3) having very high (>7000 ppm in 3 hours) 1-MCP concentrations in the headspace. Diluting the emulsion made with Isopar V (BMS-7667-2) with water, containing 2% WPI and 0.5% HEC, can generate a formulation which is physically stable and has low concentration of 1-MCP in the headspace (2870 ppm after 3 hours).

TABLE 7

Aqueous phase containing salt (APCS) emulsions diluted in water

| Sample ID | W/O composition | Dilution | Additives in water | Headspace 1-MCP concentration (ppm) | | | Comments |
|---|---|---|---|---|---|---|---|
| | | | | 1 hour | 2 hour | 5 hour | |
| BMS-7665-1 | APCS (50%)/Conosol 260 (50%) | 1:32 | 0.5% HEC + 2% WPI | 4983 | 7134 | 7430 | No settling or separation |
| BMS-7665-2 | APCS (50%)/Conosol 260 (50%) | 1:32 | 0.5%HEC | 4270 | — | 13,359 | No settling or separation |
| BMS-7665-3 | APCS (50%)/Conosol 260 (50%) | 1:32 | 2% WPI | 9085 | 8868 | 12,084 | Phase separation in 30 min |
| BMS-7666-A | APCS (50%)/Conosol 260 (50%) | 1:32 | None | 7060 | 9599 | 12,453 | No emulsification. Two phases |
| BMS-7666-B | APCS (50%)/Soybean oil (50%) | 1:32 | 0.5% HEC + 2% WPI | 3384 | 5135 | 8824 | Small droplets |
| BMS-7667-1 | APCS (50%)/Soybean oil (50%) | 1:32 | None | 3519 | 3442 | 4499 | No emulsification. Two phases |
| BMS-7667-2 | APCS (50%)/Isopar V (50%) | 1:32 | 0.5% HEC + 2% WPI | 1174 | 2870 | 8253 | No settling or separation |

To determine the optimum concentrations of WPI and HEC, a three-factor test is performed (dilution, WPI and HEC concentration being the three variables) and the results are shown in Table 8, where responses measured include 1-MCP concentration in the headspace, viscosity and the stability of the dispersion. A stable dispersion is recorded if no phase separation is observed after 3 hours.

Both the responses of 1-MCP concentration in the headspace and viscosity provide statistically significant models with high $R^2$ values (>0.05). No lack of fit is detected in these models. Only 4 out of the 15 formulations are not stable and they are all from the experiments with the HEC concentration equal to 0.05%.

TABLE 8

Diluting a APCS/Isopar V emulsion with water*

| Exp # | Dilution factor | WPI (%) | HEC (%) | 1-MCP in headspace (ppm) | Viscosity (CPs) | Stability |
|---|---|---|---|---|---|---|
| 1 | 0.0313 | 4 | 0.05 | 3438 | 4 | N |
| 2 | 0.0313 | 2.5 | 0.3 | 2559 | 71 | Y |
| 3 | 0.0156 | 1 | 0.3 | 1190 | 55 | Y |
| 4 | 0.0313 | 4 | 0.55 | 1517 | 557 | Y |
| 5 | 0.0313 | 1 | 0.05 | 2673 | 4 | N |
| 6 | 0.0625 | 4 | 0.3 | 3422 | 73 | Y |
| 7 | 0.0313 | 2.5 | 0.3 | 2334 | 58 | Y |
| 8 | 0.0156 | 4 | 0.3 | 1909 | 55 | Y |
| 9 | 0.0625 | 2.5 | 0.05 | 3088 | 5 | N |
| 10 | 0.0156 | 2.5 | 0.55 | 578 | 455 | Y |
| 11 | 0.0313 | 1 | 0.55 | 865 | 429 | Y |
| 12 | 0.0625 | 2.5 | 0.55 | 1512 | 599 | Y |
| 13 | 0.0313 | 2.5 | 0.3 | 2361 | 43 | Y |
| 14 | 0.0625 | 1 | 0.3 | 3007 | 57 | Y |
| 15 | 0.0156 | 2.5 | 0.05 | 2496 | 5 | N |

*1/64 = 0.0156 (AI, 0.01%), 1/32 = (AI, 0.02%), 1/16 = 0.062 (AI, 0.04%)

This response is not modeled because HPC concentration perfectly correlated with the stability result. The two models, generated from the data, provide the following patterns: (a) higher dilution coupled with a HEC concentration of >0.33% can provide a formulation with low headspace; (b) a WPI concentration of ≥1% is required; and (c) if a headspace concentration of 1500 ppm and a viscosity of 400 CPs are desired, the model can predict many different combinations of dilutions and WPI to achieve that. A laboratory spray experiment has shown that the sample from Experiment #10 (Table 8), which has a viscosity of 455, can be sprayed readily.

Example 3

An aqueous phase containing salt (APCS) is used as the water phase and Isopar V as the oil phase. 300 g of APCS is added to a beaker. 300 g of Isopar V (Exxon Mobil, lot #67369), containing 4% (by weight) PGPR, is added. This mixture is then homogenized at room temperature using an IKA Ultra Turrax (set at #2.5) for 5 minutes. A flowable mixture is formed immediately upon blending of the sample. 0.63% 1-MCP is detected in the W/O emulsion.

2.5% WPI in the water together with 0.55% of the thickener (Cellosize QP100MH (HEC)) can provide low headspace concentrations. Since the lowest level of WPI in the DOE is 1%, lower levels of WPI are chosen for evaluation.

The data in Table 9 suggest that lower levels of WPI provide lower release of 1-MCP in the headspace. Using 0.5% WPI (Expt. #2) results in a slight increase in the release of 1-MCP.

TABLE 9

Effect of WPI concentration on the headspace concentration of 1-MCP

| Exp # | Dilution Ratio | HEC in water (%) | WPI in water (%) | AI (%) | 1-MCP in headspace (ppm) | | |
|---|---|---|---|---|---|---|---|
| | | | | | 1 hour | 3 hours | 5 hours |
| 1 | 1:59 | 0.55 | 2.5 | — | 13,670 | 14,131 | 14,653 |
| 2 | 1:59 | 0.55 | 0.5 | 0.017 | 6,509 | 10,316 | 11,711 |
| 3 | 1:59 | 0.55 | 1.0 | 0.019 | 3,341 | 8,876 | 10,985 |

To gently stirred tap water is first added the surfactant followed by the thickener. The thickener is added slowly, and stirring is continued for ~20 minutes for complete dissolution. The W/O emulsion from above is then added. A stable dispersion is obtained. Since the highest concentration of 1-MCP is when the container is full (i.e. minimum air volume) all the headspace data reported are measured with the container 90% full and with constant agitation.

To investigate if WPI can be replaced, four different surfactants with different HLB values are evaluated. The results from the evaluations are shown in Table 10.

Pluronic L-35 (a PEG-PPG-PEG tri-block polymer from BASF) is the surfactant which provides the least amount of 1-MCP release (i.e. the lowest headspace concentration of 1-MCP) when used at 0.5% (Expt # WJZ6620B). After >3 h of agitation, the headspace concentration increases to ~13,000 ppm. This study indicates that WPI can be replaced with other widely used surfactants to provide stable dispersions of APCS with low headspace concentrations of 1-MCP. The use of WPI does provide less 1-MCP in the headspace compared to the other surfactants tested.

TABLE 10

Release of 1-MCP in the presence of different surfactants

| Exp # | HEC (%) | Surfactant (%) | HLB value | 1-MCP in headspace (ppm) 90% full | | |
|---|---|---|---|---|---|---|
| | | | | 1 hour | 3 hours | 5 hours |
| WJZ6618B | 0.55 | Tween 80 (1.0%) | 15 | 10,651 | 12,883 | 14,484 |
| WJZ6618B | 0.55 | Tween 80 (0.5%) | 15 | 8,943 | 12,198 | 13,945 |
| WJZ6619A | 0.55 | SLS (1.0%) | 40 | 10,305 | 10,141 | 11,313 |
| WJZ6619B | 0.55 | SLS (0.5%) | 40 | 13,115 | 13,393 | 13,971 |
| WJZ6620A | 0.55 | Pluronic L-35 (1.0%) (PEG-PPG-PEG) | 18-23 | 10,696 | 14,561 | 17,388 |
| WJZ6620B | 0.55 | Pluronic L-35 (0.5%) | 18-23 | 5,573 | 12,992 | 13,815 |
| WJZ6621A | 0.55 | Pluronic 10125 (1.0%) (PPG-PEG-PPG) | 12-18 | 9,896 | 13,651 | 15,614 |
| WJZ6621B | 0.55 | Pluronic 10R5 (0.5%) | 12-18 | 8,091 | 11,445 | 13,024 |

Example 4

Further investigations were performed regarding dispersion of aqueous-in-oil emulsions containing HAIP. To this end, various hydrophilic emulsifiers and polymeric surfactants were evaluated for their effects on dispersion of the emulsion and their effects on the concentration of 1-MCP in the headspace of a container.

In the instant example, AF10064K (a water-in-oil emulsion) was diluted with water (1:59; 0.01% 1-MCP), optionally containing hydroxyethyl cellulose (HEC) at varying concentrations. Headspace was measured as described previously. The results from the evaluations are shown in Table 11.

The headspace values for 1-MCP in the evaluated dispersions were advantageously low. Inclusion of HEC in the composition was beneficial for dispersing AF10064K. However, the dispersion phase separated immediately upon standing, and droplets stuck to the wall of the container.

TABLE 11

Release of 1-MCP and dispersion characteristics with HEC added to dilution

| Exp # | Dilution ratio | AI (%) | HEC (%) | 1-MCP in headspace (ppm) 90% full | | | Comments |
|---|---|---|---|---|---|---|---|
| | | | | 1 hour | 3 hours | 5 hours | |
| BMS-7734-A | 1:59 | 0.01 | — | 4,021 | 4,585 | 5,282 | No dispersion |
| BMS-7730-A | 1:59 | 0.01 | 0.55 | 2,406 | 5,619 | 6,651 | Small droplets. No phase stability |
| BMS-7735-A | 1:59 | 0.01 | 0.28 | 2,518 | 4,294 | 4,427 | Small droplets. No phase stability |

Example 5

To improve dispersibility, a nonionic surfactant was also added to the dispersion. In the instant example, various surfactants with different degrees of hydrophilic/lipophilic balance (HLB). In the instant example, HEC was added at 0.3%, and one of the following surfactants were added: i) Pluronic L-35 (0.1%), with an HLB value between 18-23; ii) Tween 80 (0.1%), with an HLB value of 15; or iii) Tween 85 (0.1%), with an HLB value of 11. Headspace was measured as described previously. The results from the evaluations are shown in Table 12.

The addition of a surfactant to the dispersion provided an improved effect on the double emulsions. As shown in Table 12, addition of Tween 85 to the dispersion provided a desirably low headspace value for 1-MCP and a fair dispersion of the resultant composition.

TABLE 12

Release of 1-MCP and dispersion characteristics with surfactants (HLB 18-23) added to dilution

| Exp # | HEC (%) | Surfactant | HLB | 1-MCP in headspace (ppm) 90% full | | | Dispersion Comments |
|---|---|---|---|---|---|---|---|
| | | | | 1 hour | 3 hours | 5 hours | |
| BMS7749-C | 0.3 | Pluronic L-35 (0.1%) | 18-23 | 11,002 | 16,360 | 17,773 | Fair |
| BMS7749-G | 0.3 | Tween 80 (0.1%) | 15 | 19,592 | 26,566 | 25,203 | Good |
| BMS7749-L | 0.3 | Tween 85 (0.1%) | 11 | 2153 | 4804 | 6681 | Fair |

Example 6

Further nonionic surfactants were subsequently tested. To further decrease the headspace concentration, a surfactant would be required that would be able to provide more steric stabilization in addition to electronic stabilization. Tween 85 is a small molecule (MW=428) and hence its ability to stabilize a surface via steric interactions is somewhat limited.

In the instant example, various polymeric surfactants with an HLB value between 11-15 were tested from the styrene-maleic anhydride copolymers sold by Cray Valley (a subsidiary of Total). For the instant example, polymeric surfactants of the following formula were tested:

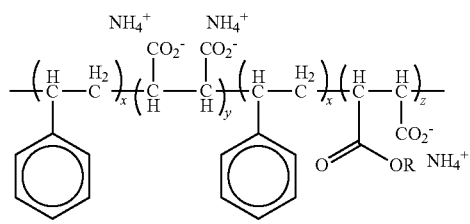

In the instant example, HEC was added at 0.3%, and one of the following surfactants were added: i) SMA 2625H (0.08% of solids), with an HLB value of 13.8; ii) SMA 3000H (0.04% of solids), with an HLB value of 12.3; or iii) SMA 1440H (0.1% of solids), with an HLB value of 14.4. Headspace was measured as described previously. The results from the evaluations are shown in Table 13.

The addition of polymeric surfactants with an HLB value of 11-15 to the dispersion unexpectedly provided a synergistic effect between the hydrophilic emulsifier and the surfactant. As shown in Table 13, polymeric surfactants with an HLB value between 11-15 to the dispersion provided a desirably low headspace value for 1-MCP and a good dispersion of the resultant composition. Addition of the surfactant SMA 3000H (HLB=12.3) resulted in a desirably low 1-MCP in the headspace and proved to be the most effective dispersant.

TABLE 13

Release of 1-MCP and dispersion characteristics with polymeric surfactants added to dilution

| Exp # | Polymer (% solids) | R | HLB | 1-MCP in headspace (ppm) 90% full | | | Dispersion Comments |
|---|---|---|---|---|---|---|---|
| | | | | 1 hour | 3 hours | 5 hours | |
| WJZ 6663 | SMA 2625H (0.08%) | Butyl | 13.8 | 567 | 1,089 | 1,465 | Good |
| WJZ 6668 | SMA 3000H (0.04%) | H | 12.3 | 476 | 878 | 1,253 | Good |
| WJZ 6670 | SMA 1440H (0.1%) | Butyl | 14.4 | 810 | 1,252 | 1,494 | Good |

Subsequently, SMA® 2625H (HLB value=13.8) and SMA® 3000H (HLB value=12.3) were further tested. AF10064K (water-in-oil emulsion) was diluted with water (1:59, 0.01% 1-MCP) containing HEC and either SMA® 2625H or SMA® 3000H. Headspace was measured as described previously. The results from the evaluations are shown in Table 14.

As shown in Table 14, polymeric surfactants are very efficient in dispersing AF10064K in water with low 1-MCP concentration in the headspace. Since SMA® 2625H has 25% solids and SMA® 3000H has only 15% solids, the amount of polymer required is <0.1%. The SMA® 3000H, with the lowest HLB, is more efficient providing stable dispersions of AF10064K with <3000 ppm of 1-MCP in the headspace, even after 5 hours.

TABLE 14

Release of 1-MCP and dispersion characteristics with SMA ® 2625H and SMA ® 3000H surfactants added to dilution

| Exp # | HEC (%) | Surfactant HLB | 1-MCP in headspace (ppm) 90% full | | | Dispersion Comments |
|---|---|---|---|---|---|---|
| | | | 1 hour | 3 hours | 5 hours | |
| BMS7752-2 | 0.3 | SMA ® 2625H (0.3) | 2,571 | 3,300 | 4,900 | Large droplets. Phase separation over time. |

TABLE 14-continued

Release of 1-MCP and dispersion characteristics with SMA ® 2625H and SMA ® 3000H surfactants added to dilution

| Exp # | HEC (%) | Surfactant HLB | 1-MCP in headspace (ppm) 90% full | | | Dispersion Comments |
|---|---|---|---|---|---|---|
| | | | 1 hour | 3 hours | 5 hours | |
| BM57757-2 | 0.3 | SMA ® 3000H (0.3) | 2787 | 2884 | 2448 | Small droplets. Some phase separation |
| BMS7757-3 | 0.3 | SMA ® 3000H (0.5) | 962 | 1131 | 1227 | Small droplets. Stable dispersion |
| BMS7757-4 | 0.3 | SMA ® 3000H (0.8) | 1075 | 1371 | 1531 | Small droplets. Stable dispersion |

What is claimed is:

1. An aqueous-in-oil-in-aqueous double emulsion composition comprising:
   (a) an aqueous-in-oil emulsion composition comprising an aqueous phase and an oil phase;
   (b) a hydrophilic emulsifier, wherein the hydrophilic emulsifier is hydroxyethyl cellulose;
   (c) a surfactant, wherein the surfactant is an aqueous salt solution of a styrene-maleic anhydride copolymer and wherein the surfactant has a hydrophilic/lipophilic balance (HLB) of between 10-15; and
   (d) a second aqueous phase,
   wherein the aqueous-in-oil emulsion composition comprises i) a molecular complex of an encapsulated volatile compound, ii) a salt, and iii) water,
   wherein the molecular complex of the encapsulated volatile compound comprises a cyclopropene molecular encapsulating agent complex, and
   wherein the cyclopropene is 1-methylcyclopropene (1-MCP).

2. The aqueous-in-oil-in-aqueous double emulsion composition of claim 1, wherein the aqueous phase comprises an aqueous phase containing salt (APCS).

3. The aqueous-in-oil-in-aqueous double emulsion composition of claim 2, wherein the salt comprises magnesium sulfate or ammonium sulfate.

4. The aqueous-in-oil-in-aqueous double emulsion composition of claim 2, wherein the APCS comprises the molecular complex of the encapsulated volatile compound.

5. The aqueous-in-oil-in-aqueous double emulsion composition of claim 2, wherein the aqueous-in-oil emulsion composition comprises a lipophilic emulsifier.

6. The aqueous-in-oil-in-aqueous double emulsion composition of claim 5, wherein the lipophilic emulsifier is polyglycerol polyricinoleate (PGPR).

7. The aqueous-in-oil-in-aqueous double emulsion composition of claim 2, wherein the aqueous-in-oil emulsion composition comprises an oil soluble thickener.

8. The aqueous-in-oil-in-aqueous double emulsion composition of claim 1, wherein the hydroxyethyl cellulose is present at a concentration of 0.3% by weight of the second aqueous phase.

9. The aqueous-in-oil-in-aqueous double emulsion composition of claim 1, wherein the styrene-maleic anhydride copolymer is a partial ester of the styrene-maleic anhydride copolymer.

10. The aqueous-in-oil-in-aqueous double emulsion composition of claim 1, wherein the surfactant has a hydrophilic/lipophilic balance (HLB) between 11-15.

11. The aqueous-in-oil-in-aqueous double emulsion composition of claim 1, wherein the surfactant has a hydrophilic/lipophilic balance (HLB) selected from the group consisting of 12, 12.3, 13, 13.8, 14, 14.4, and 15.

12. The aqueous-in-oil-in-aqueous double emulsion composition of claim 1, wherein the surfactant has a hydrophilic/lipophilic balance (HLB) selected from the group consisting of 12.3, 13.8, and 14.4.

13. A method for preparing an aqueous-in-oil-in-aqueous double emulsion composition, comprising:
   (a) preparing an aqueous-in-oil emulsion composition using an aqueous phase, an oil phase, a lipophilic emulsifier, and an oil soluble thickener;
   (b) combining an active ingredient into the aqueous-in-oil emulsion composition; and
   (c) dispersing the aqueous-in-oil emulsion composition into a second aqueous phase,
   (d) adding a hydrophilic emulsifier to the second aqueous phase, wherein the hydrophilic emulsifier is hydroxyethyl cellulose;
   (e) adding a surfactant to the second aqueous phase, wherein the surfactant is an aqueous salt solution of a styrene-maleic anhydride copolymer and wherein the surfactant has a hydrophilic/lipophilic balance (HLB) of between 10-15;
   wherein the aqueous-in-oil emulsion composition comprises i) a molecular complex of an encapsulated volatile compound, ii) a salt, and iii) water, wherein the molecular complex of the encapsulated volatile compound comprises a cyclopropene molecular encapsulating agent complex, and wherein the cyclopropene is 1-methylcyclopropene (1-MCP); and
   wherein the aqueous phase of the aqueous-in-oil composition is in direct contact with the oil phase of the aqueous-in-oil emulsion.

14. The method for preparing an aqueous-in-oil-in-aqueous double emulsion composition of claim 13, wherein the aqueous phase comprises an aqueous phase containing salt (APCS).

15. The method for preparing an aqueous-in-oil-in-aqueous double emulsion composition of claim 13, wherein the lipophilic emulsifier is polyglycerol polyricinoleate (PGPR).

16. The method for preparing an aqueous-in-oil-in-aqueous double emulsion composition of claim 13, wherein the hydroxyethyl cellulose is present at a concentration of 0.3% by weight of the second aqueous phase.

17. The method for preparing an aqueous-in-oil-in-aqueous double emulsion composition of claim 13, wherein the styrene-maleic anhydride copolymer is a partial ester of the styrene-maleic anhydride copolymer.

18. The method for preparing an aqueous-in-oil-in-aqueous double emulsion composition of claim 13, wherein the surfactant has a hydrophilic/lipophilic balance (HLB) of between 11-15.

19. The method for preparing an aqueous-in-oil-in-aqueous double emulsion composition of claim 13, wherein the surfactant has a hydrophilic/lipophilic balance (HLB) selected from the group consisting of 12, 12.3, 13, 13.8, 14, 14.4, and 15.

20. The method for preparing an aqueous-in-oil-in-aqueous double emulsion composition of claim 13, wherein the surfactant has a hydrophilic/lipophilic balance (HLB) selected from the group consisting of 12.3, 13.8, and 14.4.

\* \* \* \* \*